(12) United States Patent
Kohno

(10) Patent No.: US 12,265,316 B2
(45) Date of Patent: Apr. 1, 2025

(54) ELECTRONIC APPARATUS AND ITS CONTROL METHOD, AND ACCESSORY AND ITS CONTROL METHOD

(71) Applicant: CANON KABUSHIKI KAISHA, Tokyo (JP)

(72) Inventor: Toru Kohno, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/348,542

(22) Filed: Jul. 7, 2023

(65) Prior Publication Data
US 2023/0350277 A1    Nov. 2, 2023

Related U.S. Application Data

(62) Division of application No. 17/725,230, filed on Apr. 20, 2022, now Pat. No. 11,733,592.

(30) Foreign Application Priority Data

Apr. 23, 2021  (JP) ................. 2021-073178

(51) Int. Cl.
*G03B 17/56* (2021.01)
*G03B 15/05* (2021.01)
*G03B 31/00* (2021.01)

(52) U.S. Cl.
CPC ............ *G03B 17/56* (2013.01); *G03B 15/05* (2013.01); *G03B 31/00* (2013.01); *G03B 2206/002* (2013.01)

(58) Field of Classification Search
None
See application file for complete search history.

(56) References Cited

U.S. PATENT DOCUMENTS

| 7,742,693 B2 | 6/2010 | Kobayashi |
| 8,395,697 B2 | 3/2013 | Shikaumi |

(Continued)

FOREIGN PATENT DOCUMENTS

| CN | 203217218 U | 9/2013 |
| CN | 104272181 A | 1/2015 |

(Continued)

OTHER PUBLICATIONS

The above U.S. Patent Application Publications #1-4 were cited in a European Search Report issued on Sep. 20, 2022, which is enclosed, that issued in the corresponding European Patent Application No. 22169168.6.

(Continued)

*Primary Examiner* — Clayton E. LaBalle
*Assistant Examiner* — Diana Hancock
(74) *Attorney, Agent, or Firm* — Cowan, Liebowitz & Latman, P.C.

(57) ABSTRACT

An accessory includes a plurality of communication contacts that includes a first contact, and a control unit that notifies an electronic apparatus of a communication request by changing a signal level of the first contact from a first signal level to a second signal level different from the first signal level, and transmits information indicating a communication factor in response to a reception of a request for the information indicating the communication factor in response to a notification of the communication request. In a case where the control unit notifies the electronic apparatus of the communication request via the first contact in response to a start of a power supply, the control unit performs predetermined communication without receiving the request for the information indicating the communication factor or transmitting the information indicating the communication factor.

26 Claims, 24 Drawing Sheets

(56) References Cited

U.S. PATENT DOCUMENTS

| | | |
|---|---|---|
| 10,551,723 B2 | 2/2020 | Ota |
| 11,353,778 B2 | 6/2022 | Kawai |
| 11,366,373 B2 | 6/2022 | Kawai |
| 11,733,592 B2 * | 8/2023 | Kohno ............... G03B 31/00 396/301 |
| 2006/0034606 A1 | 2/2006 | Haraldsson |
| 2011/0129207 A1 | 6/2011 | King |
| 2012/0321287 A1 * | 12/2012 | King ............... G03B 15/05 396/56 |
| 2013/0010185 A1 | 1/2013 | Motoki |
| 2013/0076614 A1 | 3/2013 | Ive et al. |
| 2015/0116592 A1 * | 4/2015 | Suzuki ............... G03B 17/565 348/375 |
| 2016/0227084 A1 | 8/2016 | Imamura |
| 2016/0373563 A1 | 12/2016 | Ive et al. |
| 2017/0052797 A1 | 2/2017 | Shu |
| 2018/0176748 A1 | 6/2018 | Kim et al. |
| 2018/0288208 A1 | 10/2018 | Lee et al. |
| 2020/0026154 A1 | 1/2020 | Kawai |
| 2020/0073209 A1 | 3/2020 | Fujihashi |

FOREIGN PATENT DOCUMENTS

| | | | |
|---|---|---|---|
| CN | 105704721 A | 6/2016 | |
| CN | 106973166 A | 7/2017 | |
| CN | 108696631 A | 10/2018 | |
| CN | 110661964 A | 1/2020 | |
| JP | 2013-238875 A | 11/2013 | |
| JP | 2015075503 A | 4/2015 | |
| JP | 2018205717 A * | 12/2018 | ............ G03B 17/14 |
| TW | I593337 B | 7/2017 | |

OTHER PUBLICATIONS

The above Foreign Patent Documents #2-4 were cited in an Indian Office Action issued on Nov. 15, 2022, which is enclosed, that issued in the corresponding Indian Patent Application No. 202244022927.

The above foreign patent document was cited in the Jun. 4, 2024 European Office Action, which is enclosed, that issued in th corresponding European Patent Application No. 22169168.6.

The above patent documents were cited in the Aug. 12, 2024 Chinese Office Action, which is enclosed with an English Translation, that issued in Chinese Patent Application No. 202210423089.7.

Jul. 12, 2024 Indian Search Report, which enclosed, that issued in Indian Patent Application No. 202244022927.

Jul. 12, 2024 Indian Office Action, which enclosed, that issued in Indian Application No. 202244022927.

A camera, 05 2018-05-01 Xin Xiuzhen ; expert in class 84-87 1-26.
The above patent documents and Non-Patent Literature Document #1 were cited in the Jan. 10, 2025 Chinese Office Action, which is enclosed with an English Translation, that issued in Chinese Patent Application No. 202210423089.7.

* cited by examiner

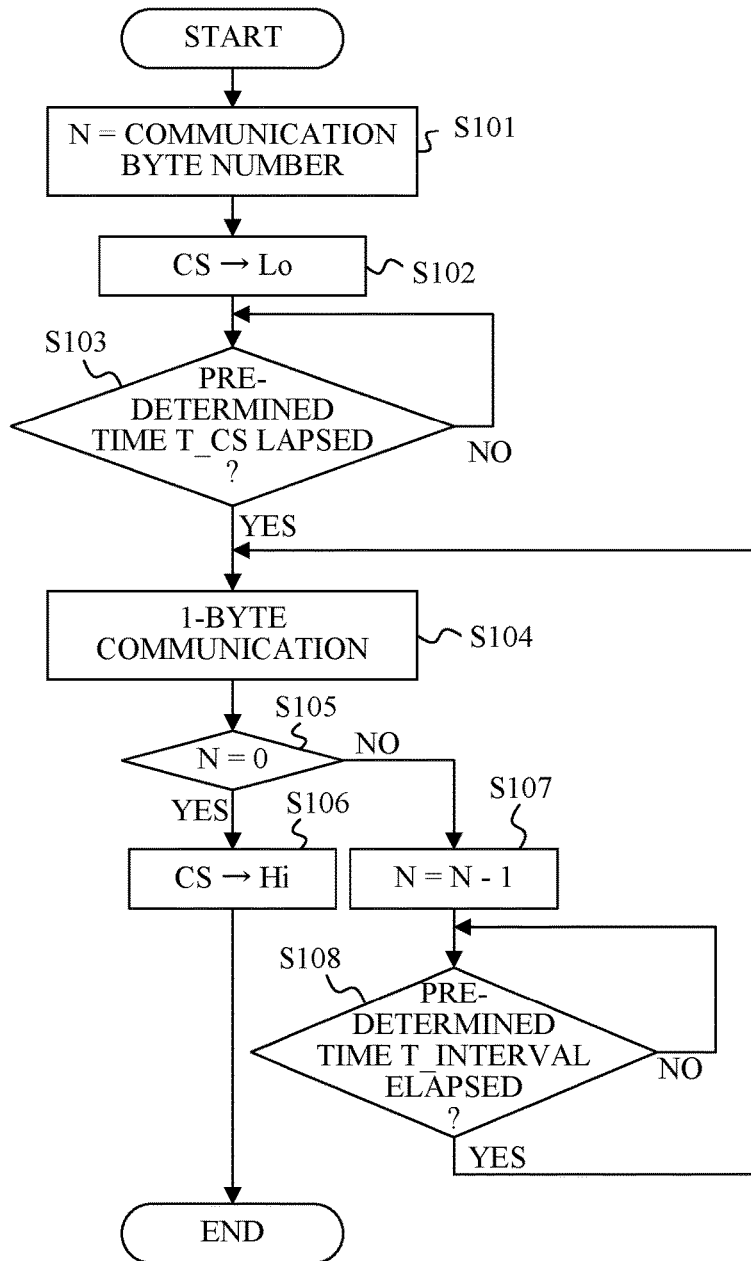
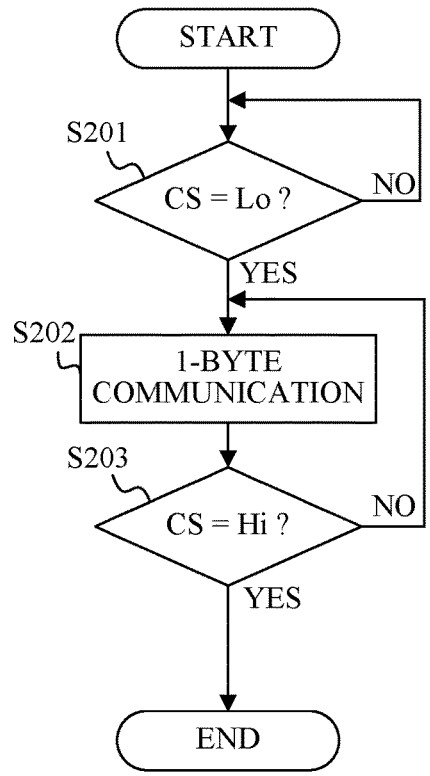
FIG. 3A                    FIG. 3B

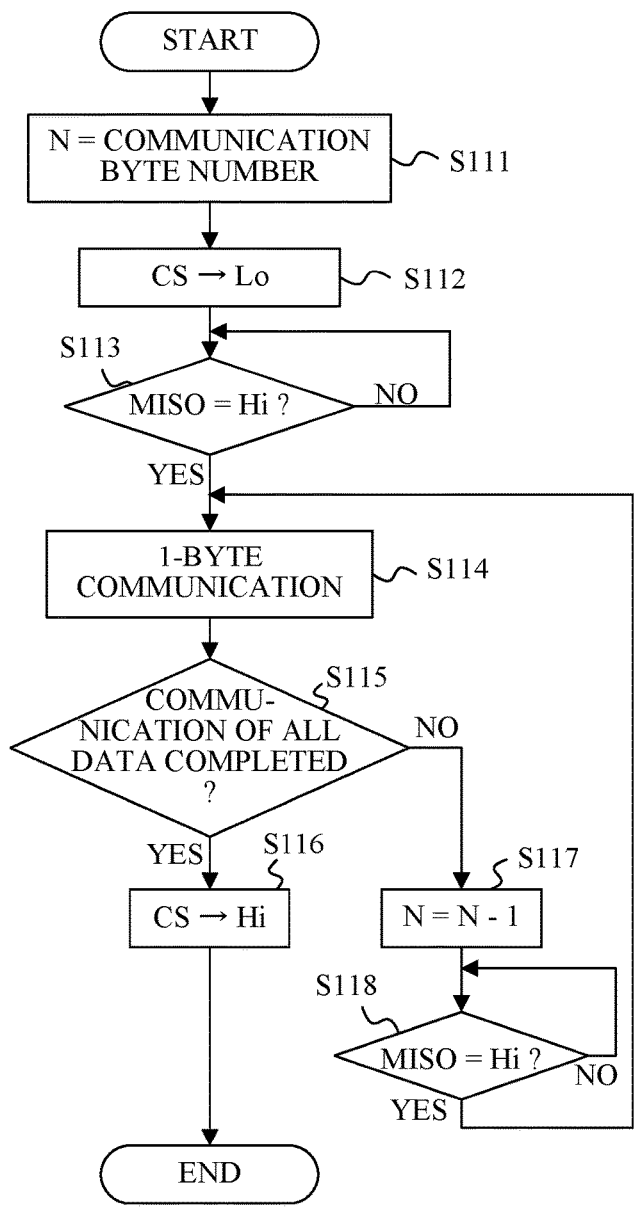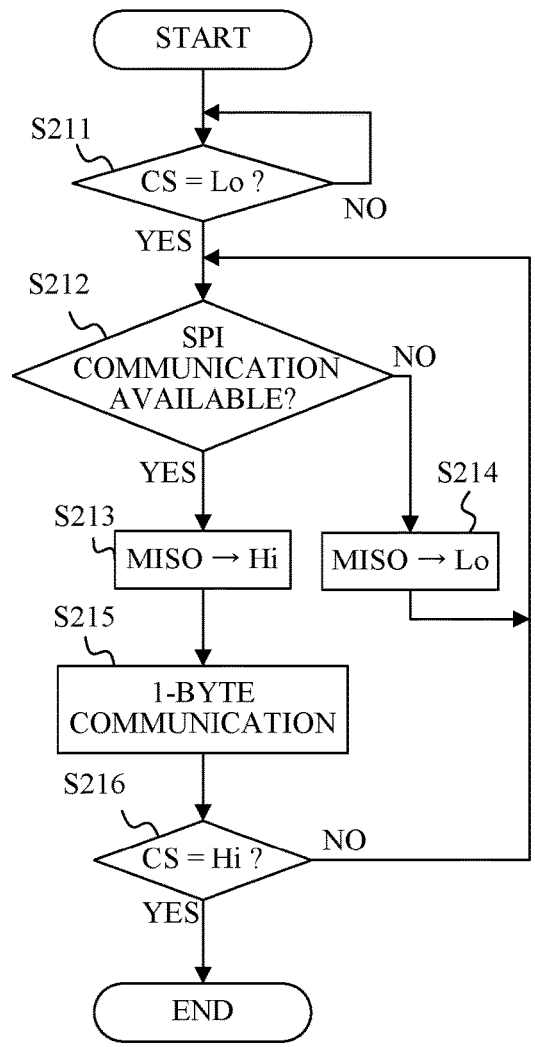
FIG. 3C
FIG. 3D

|  | 1ST BYTE | 2ND BYTE | 3RD BYTE | ... | (N-2)TH BYTE | (N-1)TH BYTE | NTH BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 4

| ADDRESS | D7 | D6 | D5 | D4 | D3 | D2 | D1 | D0 |
|---|---|---|---|---|---|---|---|---|
| 0x00 | ACC TYPE ||||||||
| 0x01 | ACC ID NO. ||||||||
| 0x02 | FIRMWARE VER. ||||||||
| 0x03 | POWER SUPPLY DURING POWER-OFF | | POWER SUPPLY DURING AUTOMATIC POWER-OFF | | POWER SUPPLY SPECIFICATION | | CHARGEABILITY | |
| 0x04 | REQUEST POWER ||||||||
| 0x05 | FIRMWARE UPDATE MODE | FIRMWARE UPDATE FUNCTION | INTERMEDIATE ACCESSORY OPERATION PERMISSION | | INTERMEDIATE ACCESSORY CONFIRMATION AT START | | I2C COMMAND COMMUNICATION AVAILABILITY | |
| 0x06 | RESERVE | | COMMUNICATION REQUEST FACTOR ACQUIRING METHOD | FUNCTIONAL SIGNAL 4 | FUNCTIONAL SIGNAL 3 | FUNCTIONAL SIGNAL 2 | FUNCTIONAL SIGNAL 1 ||
| 0x07 | RESERVE ||||||||
| 0x08 | RESERVE ||||||||
| 0x09 | RESERVE ||||||||
| 0x0A | SILENT START |||||||
| 0x0B | COMMUNICATION REQUEST FACTOR ||||||||
| 0x0C | RESERVE | | | | | | SPI PROTOCOL | CS LOGIC |
| 0x0D | COMMUNICATION INTERVAL BETWEEN SPI BYTES ||||||||
| 0x0E | COMMUNICATION INTERVAL BETWEEN SPI BYTES (IN FIRMWARE UPDATE MODE) ||||||||
| 0x0F | CHECKSUM ||||||||

FIG. 5

| NO. | TYPE |
|---|---|
| 0x00 | RESERVE |
| 0x01 | RESERVE |
| : | : |
| 0x80 | RESERVE |
| 0x81 | STROBE |
| 0x82 | INTERFACE CONVERSION ADAPTER |
| 0x83 | MICROPHONE |
| 0x84 | MULTI-ACCESSORY CONNECTION ADAPTER |
| 0x85 | RESERVE |
| 0x86 | RESERVE |
| 0x87 | RESERVE |
| 0x88 | RESERVE |
| 0x89 | RESERVE |
| 0x90 | RESERVE |
| : | : |
| 0xFF | RESERVE |

FIG. 7

| FACTOR NO. | FACTOR CONTENT |
|---|---|
| 0x00 | PRESS OF MENU CALL SW |
| 0x01 | VOICE STABILIZATION COMPLETION |
| 0x02 | VOICE UNMUTE |
| 0x03 | |
| 0x04 | |
| 0x05 | |
| 0x06 | |
| 0x07 | |
| : | |
| 0x79 | |
| 0x7A | |
| 0x7B | |
| 0x7C | |
| 0x7D | |
| 0x7E | |
| 0x7F | |

FIG. 8

| | COMMUNICATION INTERVAL |
|---|---|
| 0 | 1us |
| 1 | 2us |
| 2 | 5us |
| 3 | 10us |
| 4 | 15us |
| 5 | 25us |
| 6 | 50us |
| 7 | 100us |

FIG. 9A

| | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

FIG. 9B

ELECTRONIC APPARATUS AND ITS CONTROL METHOD, AND ACCESSORY AND ITS CONTROL METHOD

CROSS-REFERENCE TO RELATED APPLICATION

This application is a divisional of application Ser. No. 17/725,230, filed Apr. 20, 2022, the entire disclosure of which is hereby incorporated by reference.

BACKGROUND OF THE INVENTION

Field of the Invention

The present invention relates to an electronic apparatus, such as an image pickup apparatus to which an accessory is attachable.

Description of the Related Art

A system that includes an electronic apparatus and an accessory attachable to and detachable from the electronic apparatus communicates a variety of commands, notifications, and information via a plurality of contacts. Japanese Patent Laid-Open No. ("JP") 2013-238875 discloses a system in which an image pickup apparatus as an electronic apparatus that has detected an attachment of an accessory notifies the accessory of a communication permission by an interrupt signal, and then acquires accessory information from the accessory by communication. In JP 2013-238875, the image pickup apparatus determines whether or not to supply power from the image pickup apparatus to the accessory, based on the acquired accessory information (information for identifying the accessory).

The system disclosed in JP 2013-238875 has a configuration in which the electronic apparatus (image pickup apparatus) notifies the accessory of the communication permission of the accessory information. A variety of improvements of the notification from the accessory to the electronic apparatus are demanded.

SUMMARY OF THE INVENTION

The present invention provides an accessory, an electronic apparatus, a control method, a system, and a storage medium (program), each of which enables the accessory to notify the electronic apparatus.

An accessory according to one aspect of the present invention is attachable to and detachable from an electronic apparatus. The accessory includes a plurality of communication contacts that includes a first contact, at least one processor, and at least one memory coupled to the at least one processor storing instructions that, when executed by the at least one processor, cause the at least one processor to function as a control unit configured to control communication with the electronic apparatus via the plurality of communication contacts. The control unit notifies the electronic apparatus of a communication request by changing a signal level of the first contact from a first signal level to a second signal level different from the first signal level, and transmits information indicating a communication factor in response to a reception of a request for the information indicating the communication factor in response to a notification of the communication request. In a case where the control unit notifies the electronic apparatus of the communication request via the first contact in response to a start of a power supply, the control unit performs predetermined communication without receiving the request for the information indicating the communication factor or transmitting the information indicating the communication factor. A system including the above accessory and a control method of the above accessory also constitute another aspect of the present invention.

An electronic apparatus according to another aspect of the present invention is attachable to and detachable from an accessory. The electronic apparatus includes a plurality of communication contacts that includes a first contact, at least one processor; and at least one memory coupled to the at least one processor storing instructions that, when executed by the at least one processor, cause the at least one processor to function as a control unit configured to control communication with the accessory via the plurality of communication contacts. The control unit transmits a request for information indicating a communication factor in response to a notification of a communication request made when a signal level of the first contact changes from a first signal level to a second signal level different from the first signal level, and receives the information indicating the communication factor in response to a transmission of the request for the information indicating the communication factor. In a case where the control unit is notified of the communication request via the first contact in response to a start of a power supply, the control unit performs predetermined communication without transmitting the request for the information indicating the communication factor or receiving the information indicating the communication factor. A system including the above accessory and a control method of the above accessory also constitute another aspect of the present invention.

Further features of the present invention will become apparent from the following description of exemplary embodiments with reference to the attached drawings.

BRIEF DESCRIPTION OF THE DRAWINGS

FIGS. 3A to 3D illustrate flowcharts showing processing to be performed by the camera and accessory in the first embodiment.

FIG. 4 illustrates communication data in the SPI communication in the first embodiment.

FIG. 5 illustrates accessory information in the first embodiment.

FIG. 7 illustrates accessory type information in the first embodiment.

FIG. 8 illustrates factors that generate a communication request in the first embodiment.

FIGS. 9A and 9B illustrate communication intervals in the SPI communication in the first embodiment.

DESCRIPTION OF THE EMBODIMENTS

Referring now to the accompanying drawings, a description will be given of embodiments according to the present invention.

First Embodiment

Figure 1:
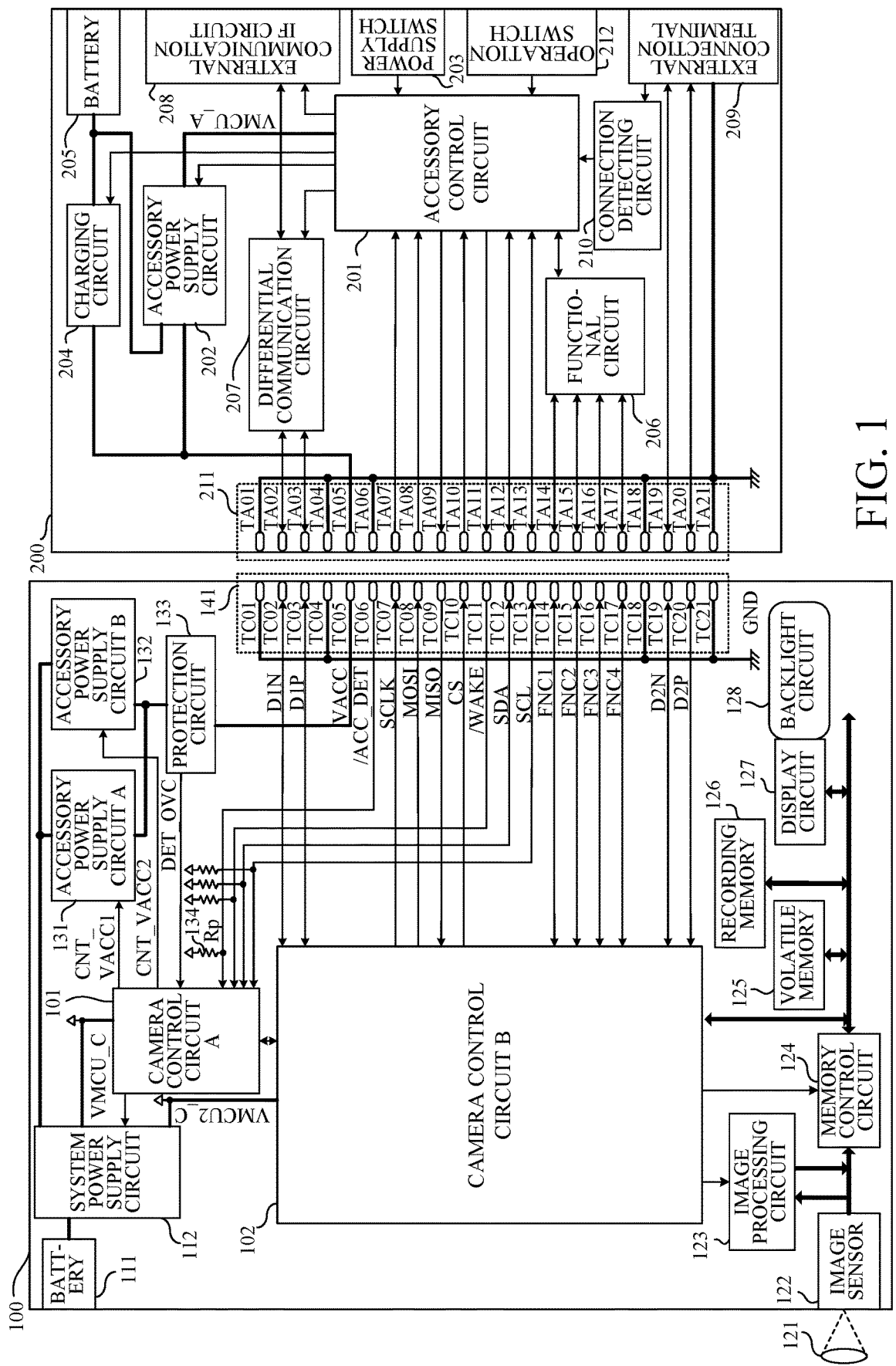
FIG. 1 illustrates a configuration of a camera system (including a camera, a lens unit, and an accessory) in a first embodiment.

FIG. 1 illustrates an electrical configuration of an image pickup system including an image pickup apparatus (referred to as a camera hereinafter) 100 as an electronic apparatus according to a first embodiment of the present invention, and an accessory 200 detachably attached to the image pickup apparatus. The accessory 200 is, for example, a microphone device or an illumination (strobe or flash) device, and includes various devices that are attachable to the camera 100. The camera 100 and the accessory 200 are electrically connected via one-to-one contacts between a plurality of contacts (terminals) TC01 to TC21 of a camera connector 141 provided in the camera 100 and a plurality of contacts TA01 to TA21 of an accessory connector 211 provided in the accessory 200, respectively. The accessory 200 may not have part of the plurality of contacts TA01 to TA21.

The camera 100 is supplied with power from a battery 111. The battery 111 is attachable to and detachable from the camera 100. A camera control circuit A 101 that serves as a first processing unit, a control unit, and a receiving unit in the camera 100 and a camera control circuit B 102 that serves as a second processing unit are circuits that control the entire camera 100, and include a processor (microcomputer) such as a CPU. The camera control circuit A 101 and the camera control circuit B 102 execute various controls and processing in accordance with a computer program.

The camera control circuit A 101 monitors operations of switches and the like for unillustrated camera operations, and controls a system power supply according to the operation of the user. The camera control circuit A 101 includes a low power type processor that is operable even when the camera 100 is in a power-saving state as a low power consumption state. On the other hand, the camera control circuit B 102 is responsible for controlling an image sensor 122, a display circuit 127, and the like. The camera control circuit B 102 includes a processor that stops operating in the low power consumption mode and operates in a normal operating state.

Although the camera control circuit A 101 and the camera control circuit B 102 include separate processors in this embodiment, these may be provided in a single processor.

A system power supply circuit 112 is a circuit that generates power to be supplied to each circuit in the camera 100, and includes a DC/DC converter circuit, Low Drop Out (LDO), a charge pump circuit, and the like. A voltage of 1.8 V that is generated by the system power supply circuit 112 that receives power from the battery 111 is constantly supplied as camera microcomputer power supply VMCU_C to the camera control circuit A 101. Several types of voltages that are generated by the system power supply circuit 112 are supplied as camera microcomputer power supply VMCU2_C to the camera control circuit B 102 at an arbitrary timing. The camera control circuit A 101 controls turning on and off of the power supply to each circuit in the camera 100 by controlling the system power supply circuit 112.

An optical lens 121 is attachable to and detachable from the camera 100. Light from an object incident through the optical lens 121 is imaged on the image sensor 122 including a CMOS sensor, a CCD sensor, or the like. The optical lens 121 and the camera 100 may be integrated. An object image formed on the image sensor 122 is encoded into a digital imaging signal. An image processing circuit 123 performs image processing such as noise reduction processing and white balance processing for the digital imaging signal to generate image data, and converts the image data into an image file in a JPEG format or the like in order to record the image data in a recording memory 126. The image processing circuit 123 generates from the image data VRAM image data to be displayed on the display circuit 127.

A memory control circuit 124 controls transmissions and receptions of image data and other data generated by the image processing circuit 123 and the like. A volatile memory 125 is a memory capable of high-speed reading and writing such as DDR3SDRAM, and is used as a workspace for image processing that is performed by the image processing circuit 123. The recording memory 126 is a readable and writable recording medium such as an SD card or a CFexpress card that is attachable to and detachable from the camera 100 via an unillustrated connector. The display circuit 127 is a display disposed on a back surface of the camera 100, and includes an LCD panel, an organic EL display panel, and the like. A backlight circuit 128 adjusts the brightness of the display circuit 127 by changing the light amount of the backlight of the display circuit 127.

Each of a power supply circuit A for the accessory (accessory power supply circuit A hereinafter; first power supply unit) 131 and a power supply circuit B for the accessory (accessory power supply circuit B hereinafter; second power supply unit) 132 is a voltage conversion circuit that converts voltage supplied from the system power supply circuit 112 into predetermined voltage and generates 3.3 V as accessory power supply VACC in this embodiment. This configuration may convert the voltage into another voltage.

The accessory power supply circuit A 131 is a power supply circuit that includes LDO or the like and has a low self-power consumption. The accessory power supply circuit B 132 includes a DC/DC converter circuit or the like, and can pass current larger (or supply power higher) than that of the accessory power supply circuit A 131. The self-power consumption of the accessory power supply circuit B 132 is larger than that of the accessory power supply circuit A 131. Therefore, when a load current is small, the accessory power supply circuit A 131 is more efficient than the accessory power supply circuit B 132, and when the load current is large, the accessory power supply circuit B 132 is more efficient than the accessory power supply circuit A 131. The camera control circuit A 101 controls turning on and off of voltage outputs of the accessory power supply circuits A 131 and B 132 according to the operating state of the accessory 200.

A protection circuit 133 includes a current fuse element, an electronic fuse circuit in which a poly-switch element or a resistor, an amplifier, and a switching element are combined, or the like. The protection circuit 133 outputs overcurrent detecting signal DET_OVC when power supply current values supplied to the accessory 200 from the accessory power supply circuits A 131 and B 132 are higher than a predetermined value and become excessive (abnormal). In this embodiment, the protection circuit 133 is the electronic fuse circuit, and notifies the camera control circuit A 101 of the overcurrent detecting signal DET_OVC when a current of 1 A or more flows. The overcurrent detecting signal DET_OVC indicates the overcurrent by becoming at a high level. The predetermined value may be different from 1 A.

The camera connector 141 is a connector for an electrical connection with the accessory 200 via 21 contacts TC01 to TC21 that are arranged in a row. The contacts TC01 to TC21 are arranged in this order from one end to the other end in this arrangement direction.

TC01 is connected to the ground (GND) and serves not only as a reference potential contact but also as a contact for controlling wiring impedances of the differential signals DIN and DIP. TC01 corresponds to a third ground contact.

The differential signal DIN that is connected to TC02 and the differential signal D1P that is connected to TC03 are differential data communication signals that perform data communications in pairs, and are connected to the camera control circuit B 102. TC02, TC03, TC07 to TC10, TC12 to TC17, TC19 and TC20, which will be described below, are communication contacts.

TC04 as a first ground contact is connected to GND and serves as a reference potential contact for the camera 100 and the accessory 200. TC04 is disposed outside TC05 described below in the contact arrangement direction.

The accessory power supply VACC generated by the accessory power supply circuits A 131 and B 132 is connected to TC05 as a power supply contact via the protection circuit 133.

An accessory attachment detecting signal/ACC_DET is connected to TC06 as an attachment detecting contact. The accessory attachment detecting signal/ACC_DET is pulled up to the camera microcomputer power supply VMCU_C via a resistor element Rp 134 (such as 10 kΩ). The camera control circuit A 101 can detect whether or not the accessory 200 is attached by reading a signal level of the accessory attachment detecting signal/ACC_DET. If the signal level (potential) of the accessory attachment detecting signal/ ACC_DET is high (predetermined potential), it is detected that the accessory 200 is not attached, and if it is a low level (GND potential) as an active potential, it is detected that the accessory 200 is attached.

Changing the signal level (potential) of the accessory attachment detecting signal/ACC_DET from the high level (Hi) to the low level (Lo) when the camera 100 is powered on triggers various transmissions between the camera 100 and the accessory 200 via contacts.

The camera control circuit 101 supplies power to the accessory 200 via TC05 as the power supply contact in response to detecting the attachment of the accessory 200.

SCLK connected to TC07 as a communication contact, MOSI connected to TC08, MISO connected to TC09, and Chip Select (CS) connected to TC10 are signals for communications by a Serial Peripheral Interface (SPI) communication method (referred to as an SPI communication hereinafter) as a second communication method in which the camera control circuit B 102 becomes a communication master. SCLK is a clock signal, MOSI is a transmission signal, MISO is a reception signal, CS is a communication selecting signal serving as a signal for selecting a communication partner. In this embodiment, the SPI communication has a communication clock frequency of 1 MHz, a data length of 8 bits (1 byte), and a bit order of MSB first, and a full-duplex communication method.

Figure 2A:
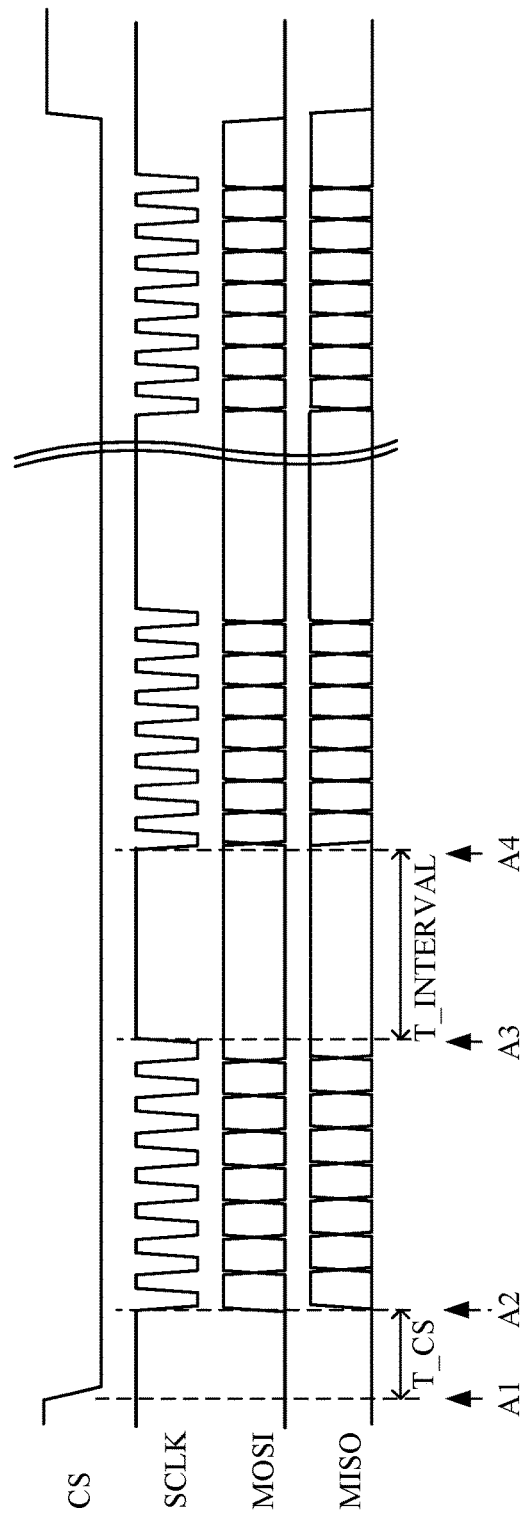
FIGS. 2A and 2B illustrate protocols for SPI communication in the first embodiment.

In this embodiment, the camera 100 and the accessory 200 support two types of communication protocols for the SPI communication method. Communication protocol A is a communication method in which the camera 100 does not confirm whether the accessory 200 is in a communicable state before outputting SCLK, and is referred to as SPI protocol A in the following description. FIG. 2A illustrates an outline of a communication waveform of the SPI protocol A. In this figure, CS is low-active.

The camera control circuit B 102 changes CS into a low level (active) at timing A1 and requests the accessory control circuit 201 for the SPI communication.

At timing A2 predetermined time T_CS after the timing A1, the camera control circuit B 102 starts outputting SCLK and MOSI. When the accessory control circuit 201 detects a trailing edge of SCLK, the accessory control circuit 201 starts outputting MISO.

The camera control circuit B 102 stops outputting SCLK at timing A3 when completing outputting 1-byte SCLK.

The camera control circuit B 102 stops outputting SCLK at the timing A3 for predetermined time T_INTERVAL, resumes the output of SCLK at timing A4 after the T_INTERVAL has elapsed, and performs the next 1-byte communication.

A flowchart in FIG. 3A illustrates processing to be performed by the camera control circuit B 102 in the SPI protocol A. S stands for the step.

In S101, the camera control circuit B 102 stores a numerical value indicating the number of bytes to be communicated in internal variable N. For example, 3 is stored in a case of 3-byte communication.

In S102, the camera control circuit B 102 changes CS to a low level and requests SPI communication.

In S103, the camera control circuit B 102 performs wait processing until predetermined time T_CS elapses after CS is changed to the low level. After the predetermined time T_CS elapses, the flow proceeds to S104.

In S104, the camera control circuit B 102 controls an SCLK output, a MOSI data output, and a MISO data input and performs 1-byte data communication.

In S105, the camera control circuit B 102 confirms whether or not the internal variable N indicating the number of communication bytes is 0. In the case where the internal variable N is 0, the flow proceeds to S106, and in the case where the internal variable N is other than 0, the flow proceeds to S107.

In S107, the camera control circuit B 102 stores as new internal variable N a value obtained by decrementing the numerical value of the internal variable N indicating the number of communication bytes by 1.

In S108, the camera control circuit B 102 performs wait processing until the predetermined time T_INTERVAL elapses after the 1-byte data communication in S104 is completed. Then, after the predetermined time T_INTERVAL elapses, the flow returns to the processing in S104, and the same processing is executed again.

In S106, the camera control circuit B 102 changes CS to a high level and ends a series of SPI communication.

A flowchart in FIG. 3B illustrates processing to be performed by the accessory control circuit 201 in the SPI protocol A.

In S201, the accessory control circuit 201 confirms whether or not CS has changed to a low level. In the case where CS has changed to the low level, the flow proceeds to S202, and in the case where CS has not changed to the low level, the flow returns to S211.

In S202, the accessory control circuit 201 performs the 1-byte data communication by the MOSI data input control and MISO data output control in response to the input of the SCLK signal.

In S203, the accessory control circuit 201 confirms whether or not CS has changed to a high level. In the case where the CS has changed to the high level, it is determined that the SPI communication has been completed, and in the case where the CS has not changed to the high level, the flow returns to S202 so as to perform the next 1-byte communication.

Figure 2B:
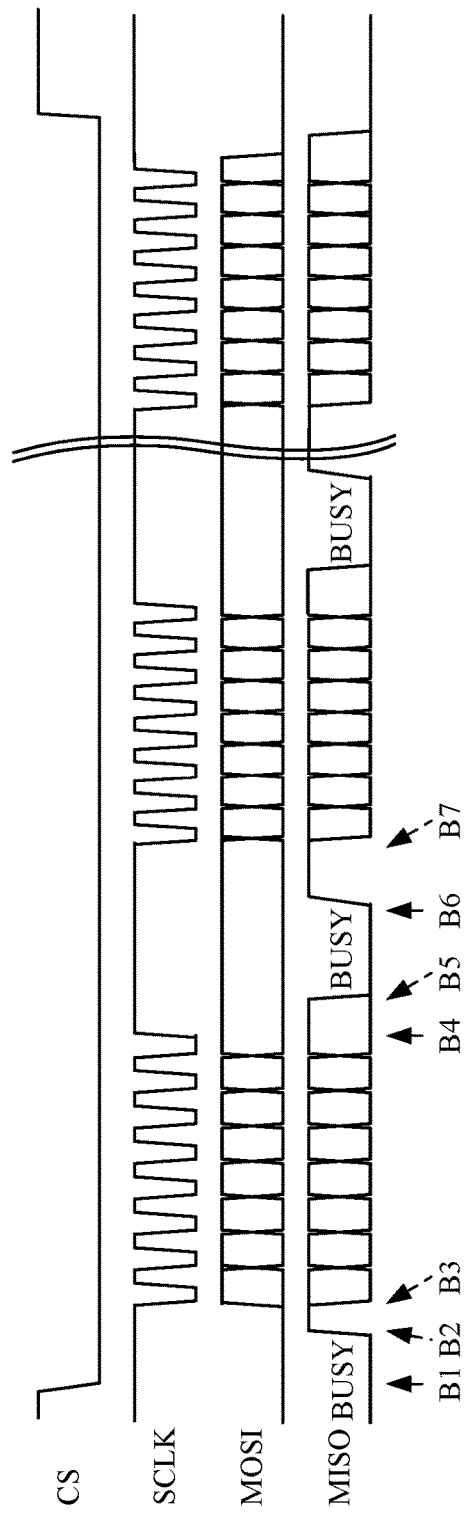

Communication protocol B in the SPI communication method is a communication method in which the camera 100 confirms whether the accessory 200 is in a communicable state before outputting SCLK, and is referred to as SPI protocol B in the following description. FIG. 2B illustrates an outline of a communication waveform of the SPI protocol B.

The camera control circuit B 102 changes the CS to a low level at timing B1 and requests the accessory control circuit 201 for the SPI communication. The camera control circuit B 102 confirms the potential of MISO together with the communication request. If MISO is at a high level, it is determined that the accessory control circuit 201 is in a communicable state, and if it is at a low level, it is determined that the accessory control circuit 201 is in an incommunicable state.

On the other hand, when the accessory control circuit 201 detects a trailing edge of CS at timing B2, the accessory control circuit 201 performs control for changing MISO to a high level if the SPI communication is available, and performs control for changing MISO to a low level if the communication is unavailable.

When the camera control circuit B 102 confirms that MISO is at a high level at timing B3, the camera control circuit B 102 starts outputting SCLK and MOSI. The accessory control circuit 201 starts outputting MISO when detecting a trailing edge of SCLK.

The camera control circuit B 102 stops outputting SCLK when the 1-byte SCLK output is completed at timing B4.

After the 1-byte communication, the accessory control circuit 201 performs control for changing MISO to a high level if the SPI communication is available, and control for changing MISO to a low level if the SPI communication is unavailable, as illustrated at timings B5 and B6.

The camera control circuit B 102 confirms the potential of MISO at timing B7. If MISO is at a high level, it is determined that the accessory control circuit 201 is in a communicable state, and if MISO is at a low level, it is determined that the accessory control circuit 201 is in an incommunicable state.

A flowchart in FIG. 3C illustrates processing to be performed by the camera control circuit B 102 in the SPI protocol B.

In S111, the camera control circuit B 102 stores a numerical value indicating the number of bytes to be communicated in the internal variable N. For example, 3 is stored in the case of 3-byte communication.

In S112, the camera control circuit B 102 changes CS to a low level and requests SPI communication.

In S113, the camera control circuit B 102 confirms whether MISO has changed to a high level. If MISO is at the high level, the flow proceeds to S114, and if MISO has not yet at the high level, the flow returns to S113.

In S114, the camera control circuit B 102 controls an SCLK output, a MOSI data output, and a MISO data input so as to perform 1-byte data communication.

In S115, the camera control circuit B 102 confirms whether or not the communications of all data have been completed (the internal variable N indicating the number of communication bytes is 0). In the case where the internal variable N is 0, the flow proceeds to S116, and in the case where the internal variable N is other than 0, the flow proceeds to S117.

In S117, the camera control circuit B 102 stores as new internal variable N a value obtained by decrementing the numerical value of the internal variable N indicating the number of communication bytes by 1.

In S118, the camera control circuit B 102 confirms whether or not MISO has changed to a high level. In the case where MISO is at the high level, the flow proceeds to S114, and in the case where MISO is not at the high level, the flow returns to S118.

In S116, the camera control circuit B 102 changes CS to a high level and ends a series of SPI communications.

A flowchart in FIG. 3D illustrates processing to be performed by the accessory control circuit 201 in the SPI protocol B.

In S211, the accessory control circuit 201 confirms whether or not CS has changed to a low level. In the case where CS has changed to the low level, the flow proceeds to S212, and in the case where CS has not changed to the low level, the flow returns to S211.

In S212, the accessory control circuit 201 confirms whether or not the SPI communication is available. In the case where the SPI communication is available, the flow proceeds to S213, and in the case where the SPI communication is unavailable, the flow proceeds to S214.

In S213, the accessory control circuit 201 performs control for changing MISO to a high level and the flow proceeds to S215.

In S214, the accessory control circuit 201 performs control for changing MISO to a low level and the flow returns to S212.

In S215, the accessory control circuit 201 controls a MOSI data input and a MISO data output in response to the SCLK signal input and performs 1-byte data communication.

In S216, the accessory control circuit 201 confirms whether or not CS has changed to a high level. If CS has changed to the high level, it is determined that the SPI communication has been completed, and if CS has not changed to the high level, the flow returns to S212 so as to perform the next 1-byte communication.

FIG. 4 illustrates communication contents in notifying an operation execution instruction (command) from the camera 100 to the accessory 200 by the SPI communication in this embodiment.

The camera control circuit B 102 transmits as MOSI data information CMD indicating a command number to the accessory control circuit 201 in the first-byte communication. The accessory control circuit 201 transmits as MISO data a value of 0xA5, which is information indicating a communicable state, to the camera control circuit B 102. In the case where the first-byte communication processing cannot be executed, the accessory control circuit 201 transmits as MISO data a value other than 0xA5 to the camera control circuit B 102.

The camera control circuit B 102 transmits argument MOSI_DATA1 corresponding to the command number CMD to the accessory control circuit 201 in the second-byte communication. Then, from the third byte to the (N−2)th byte, the arguments MOSI_DATA2 to MOSI_DATA [N−3] corresponding to the command number CMD are similarly transmitted to the accessory control circuit 201.

The accessory control circuit 201 transmits as MISO data the command number CMD received in the first byte to the camera control circuit B 102 in the second-byte communication. This configuration enables the camera control circuit B 102 to determine that the accessory control circuit 201 has correctly received the MOSI data.

The accessory control circuit 201 transmits, as MISO data, return value MISO_DATA1 corresponding to the command number CMD to the camera control circuit B 102 in the third-byte communication. Then, from the fourth byte to the (N−2)th byte, arguments MISO_DATA2 to MISO_DATA [N−4] corresponding to the command number CMD are similarly transmitted to the camera control circuit B 102.

Assume that the number of arguments and the number of return values are previously determined for each command number. One or both of the argument and the return value may not be omitted.

The camera control circuit B 102 transmits checksum data CheckSum_C as MOSI data to the accessory control circuit 201 in the (N−1)th byte communication. The checksum data CheckSum_C is a value calculated by the following expression. CheckSum_C=EXOR (AND (SUM (CMD, MOSI_DATA1, . . . , MOSI_DATA [N−3]), 0xFF), 0xFF)

The accessory control circuit 201 transmits 0x00 as MISO data.

Next, the camera control circuit B 102 transmits 0x00 as MOSI data to the accessory control circuit 201 in the Nth-byte communication.

The accessory control circuit 201 transmits checksum data CheckSum_A as MISO data. The checksum data CheckSum_A is calculated by the following expression when the value of CheckSum_C received by the camera control circuit B 102 in the (N−1)th-byte communication and the value of CheckSum_C calculated by the camera control circuit B 102 accord with each other.

CheckSum_$A$=EXOR(AND(SUM(0x$A$5,CMD, MISO_DATA1, . . . ,MOSI_DATA[$N$−4]), 0x$FF$),0x$FF$)

On the other hand, if the value of CheckSum_C received by the camera control circuit B 102 in the (N−1)th-byte communication and the value of CheckSum_C calculated by the camera control circuit B 102 do not accord with each other, the value is calculated by the following expression.

CheckSum_$A$=AND(SUM(0x$A$5,CMD, MISO_DATA1, . . . ,MOSI_DATA[$N$−4]), 0x$FF$)

TC11 as a signal contact (communication request contact, first contact) illustrated in FIG. 1 is connected with a communication request signal (second input signal)/WAKE for requesting communication from the accessory 200 to the camera 100 (camera control circuit A 101). The communication request signal/WAKE is pulled up to the camera microcomputer power supply VMCU_C via a resistor. The camera control circuit A 101 can detect a communication request from the accessory 200 by detecting a change (trailing edge) in the communication request signal/WAKE.

SDA connected to TC12 as a communication contact and SCL connected to TC13 are signals for performing Inter-Integrated Circuit (I2C) communications (referred to as I2C communication hereinafter) as the first communication method in which the camera control circuit A 101 is a communication master. SDA is a data signal and SCL is a clock signal. SDA and SCL are open-drain communications pulled up by the camera microcomputer power supply VMCU_C, and have communication frequencies of 100 kbps in this embodiment.

In the I2C communication, both data transmission from the camera 100 and data transmission from the accessory 200 are performed via SDA. When the SPI communication and the I2C communication are compared with each other, the communication speed of the I2C communication is lower than that of the SPI communication. The SPI communication has a communication speed higher than that of the I2C communication, and therefore is suitable for information communication having a large amount of data. Therefore, in the communication between the camera 100 and the accessory 200 in this embodiment, information having a large amount of data is communicated by using the SPI communication, and information having a small amount of data is communicated by using the I2C communication. For example, data is first communicated by using the I2C communication, and when the SPI communication is available or needs to be executed based on this data, control can be made to further execute the SPI communication.

Figure 19A:
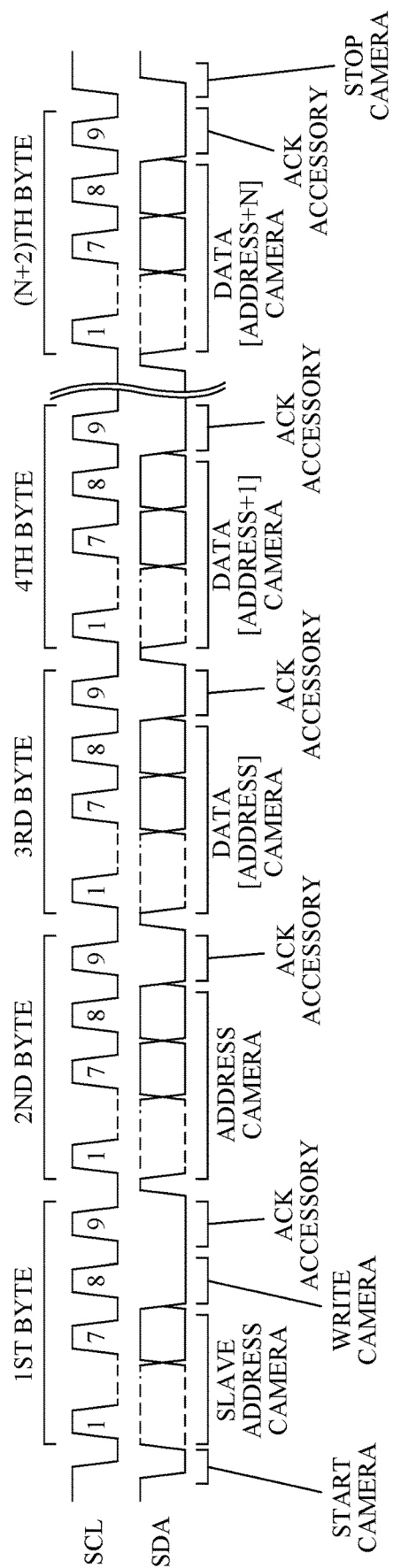
FIGS. 19A and 19B illustrate examples of I2C communication waveforms.
Figure 19B:
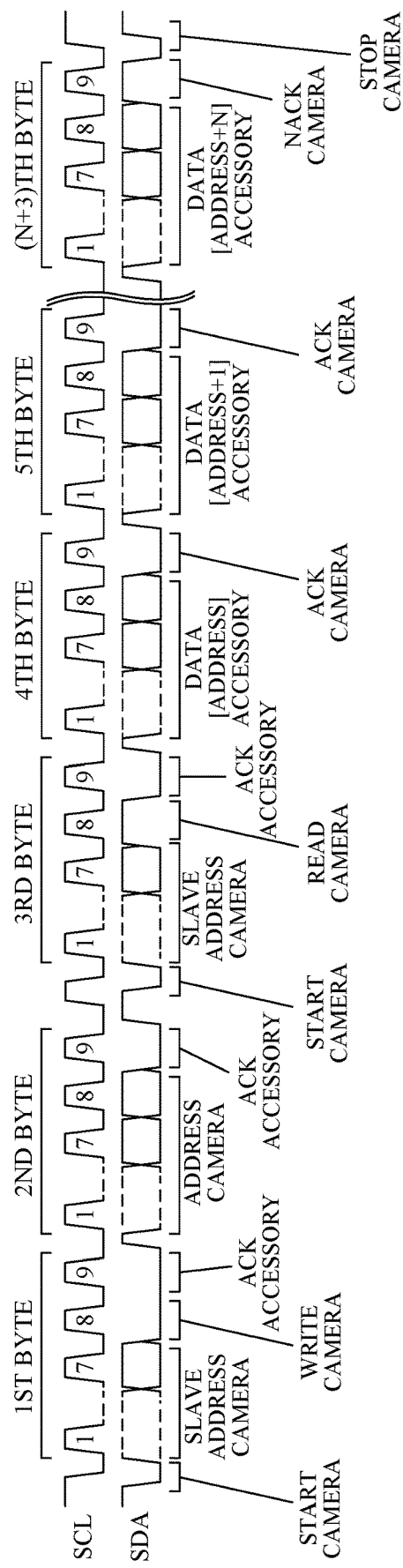

FIGS. 19A and 19B illustrate examples of I2C communication waveforms. FIG. 19A illustrates a waveform example in a case where the camera transmits N-byte data (DATA [1] to DATA [N]) to the accessory, and FIG. 19B illustrates a waveform example in a case where the camera receives N-byte data (DATA [1] to DATA [N]) from the accessory. In FIGS. 19A and 19B, an upper waveform illustrates SCL and a lower waveform illustrates SDA.

Illustrated below the SDA waveform are the meaning of a signal at each timing and whether a control circuit for controlling the output level of the SDA signal is the camera control circuit A 101 or the accessory control circuit 201. The communication data includes 1-byte unit data and 1-bit information indicating a response. A top of each figure illustrates the number of bytes of data from the communication start.

Since details of the communication contents will be described below with reference to FIGS. 20 to 22, an outline will be described with reference to FIGS. 19A and 19B.

In FIG. 19A, in the first-byte communication and the second-byte communication, the camera control circuit A 101 notifies the accessory control circuit 201 of storage address information on data to be transmitted. In the third-byte communication to the (N+2)th-byte communication, the camera control circuit A 101 transmits N-byte data (DATA [ADDRESS] to DATA [ADDRESS+N]) to the accessory control circuit 201.

In FIG. 19B, in the first-byte communication and the second-byte communication, the camera control circuit A 101 notifies the accessory control circuit 201 of storage address information on data to be received. In the third-byte communication to the (N+3)th-byte communication, the camera control circuit A 101 receives N-byte data (DATA [ADDRESS] to DATA [ADDRESS+N]) from the accessory control circuit 201.

Figure 20:
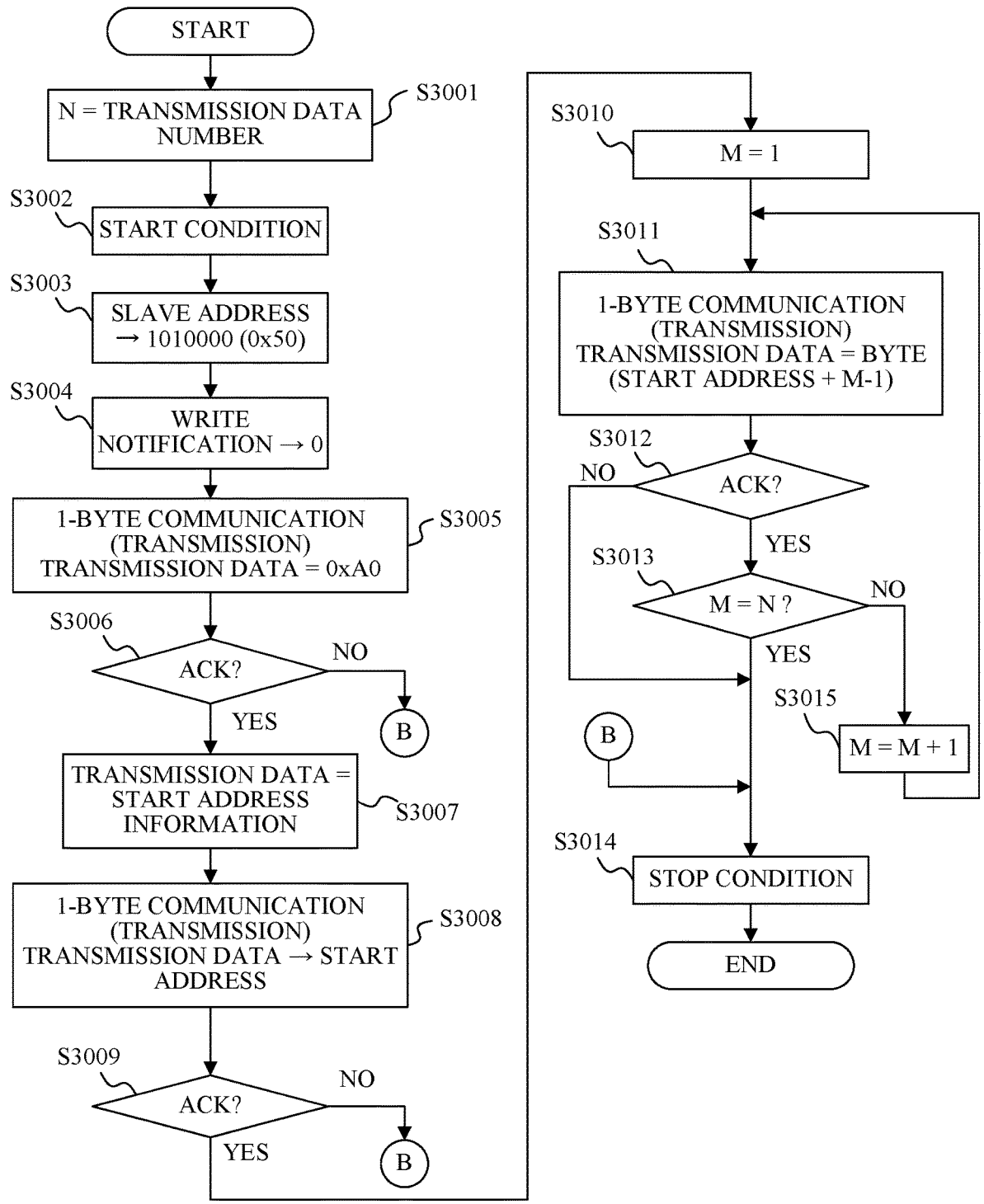
FIG. 20 illustrates processing to be performed by the camera when N-byte data is transmitted from the camera to the accessory in the first embodiment.

A flowchart in FIG. 20 illustrates processing to be performed by the camera control circuit A 101 when the camera control circuit A 101 transmits N-byte data to the accessory control circuit 201.

In S3001, the camera control circuit A 101 stores a numerical value indicating the number of bytes to be transmitted in internal variable N. For example, when 3 bytes are transmitted, 3 is stored. In this embodiment, 3 is stored.

In S3002, the camera control circuit A 101 changes SDA to a low level while SCL is at a high level (START condition). Thereby, the accessory control circuit 201 is notified of a communication start.

In S3003, the camera control circuit A 101 sets slave address information indicating a slave address of the accessory control circuit 201 to the upper 7 bits of the transmission data. In this embodiment, assume that the slave address of the accessory control circuit 201 is 1010000 in binary.

In S3004, the camera control circuit A 101 sets information indicating that it is write communication to the lower 1 bit of the transmission data. Setting this bit to 0 means the write communication.

In S3005, the camera control circuit A 101 transmits to the accessory control circuit 201 data that has been set as the transmission data in S3003 and S3004 (10100000 in binary and 0xA0 in hexadecimal).

In S3006, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to S3007. On the other hand, in the case where the signal level of SDA is high, it is determined that the accessory control circuit 201 has not normally received the data and the flow proceeds to S3014.

In S3007, the camera control circuit A 101 sets to transmission data the storage address information (start address information) of the data to be transmitted to the accessory control circuit 201. In this embodiment, the size of the start address information is 1 byte, and the value is 0x00.

In S3008, the camera control circuit A 101 transmits the set 1-byte start address information (value 0x00) to the accessory control circuit 201.

In S3009, the camera control circuit A 101 outputs SCL for one clock and confirms the signal level of SDA after transmitting the 1-byte start address information data. In the case where the signal level of SDA is low, it is determined to be a data reception notification (ACK) from the accessory control circuit 201 and the flow proceeds to S3010. On the other hand, in the case where the signal level of SDA is high, it is determined that the accessory control circuit 201 has not normally received the data and the flow proceeds to S3014.

In S3010, the camera control circuit A 101 stores 1 in internal variable M. The internal variable M is a variable for counting the number of transmission data.

In S3011, the camera control circuit A 101 outputs 1-byte data to the accessory control circuit 201 by outputting 1-byte SCL and by changing SDA to the desired signal level while SCL is at a low level. Here, the start address information is 0x00 and the internal variable M is 1, and thus 1-byte data corresponding to the address 0x00 is transmitted.

In S3012, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to S3013. On the other hand, in the case where the signal level of SDA is high, it is determined that the accessory control circuit 201 has not normally received the data and the flow proceeds to S3014.

In S3013, the camera control circuit A 101 confirms whether the internal variable M has the same value as that of the internal variable N. In the case where the internal variable M has the same value as that of the internal variable N, it is determined that the transmissions of all data have been completed and the flow proceeds to S3014. In the case where the internal variable M is not the same value as that of the internal variable N, it is determined that there are still data to be transmitted and the flow proceeds to S3015.

In S3015, the camera control circuit A 101 adds 1 to the internal variable M and the flow returns to S3011.

Thus, after the flow returns to S3011, the camera control circuit A 101 sequentially increments the addresses of the data to be transmitted, and transmits 1-byte data corresponding to each address. In this way, the camera control circuit A 101 transmits N-byte data to the accessory control circuit 201 by repeatedly transmitting 1-byte data until the internal variable M and the internal variable N have the same value in the processing in S3013. In the case where the internal variable N is set to 3 as in this embodiment, 3-byte data can be transmitted.

In S3014, the camera control circuit A 101 changes SDA to a high level while SCL is at a high level (STOP condition). Thereby, the accessory control circuit 201 is notified of a communication end.

Figure 21:
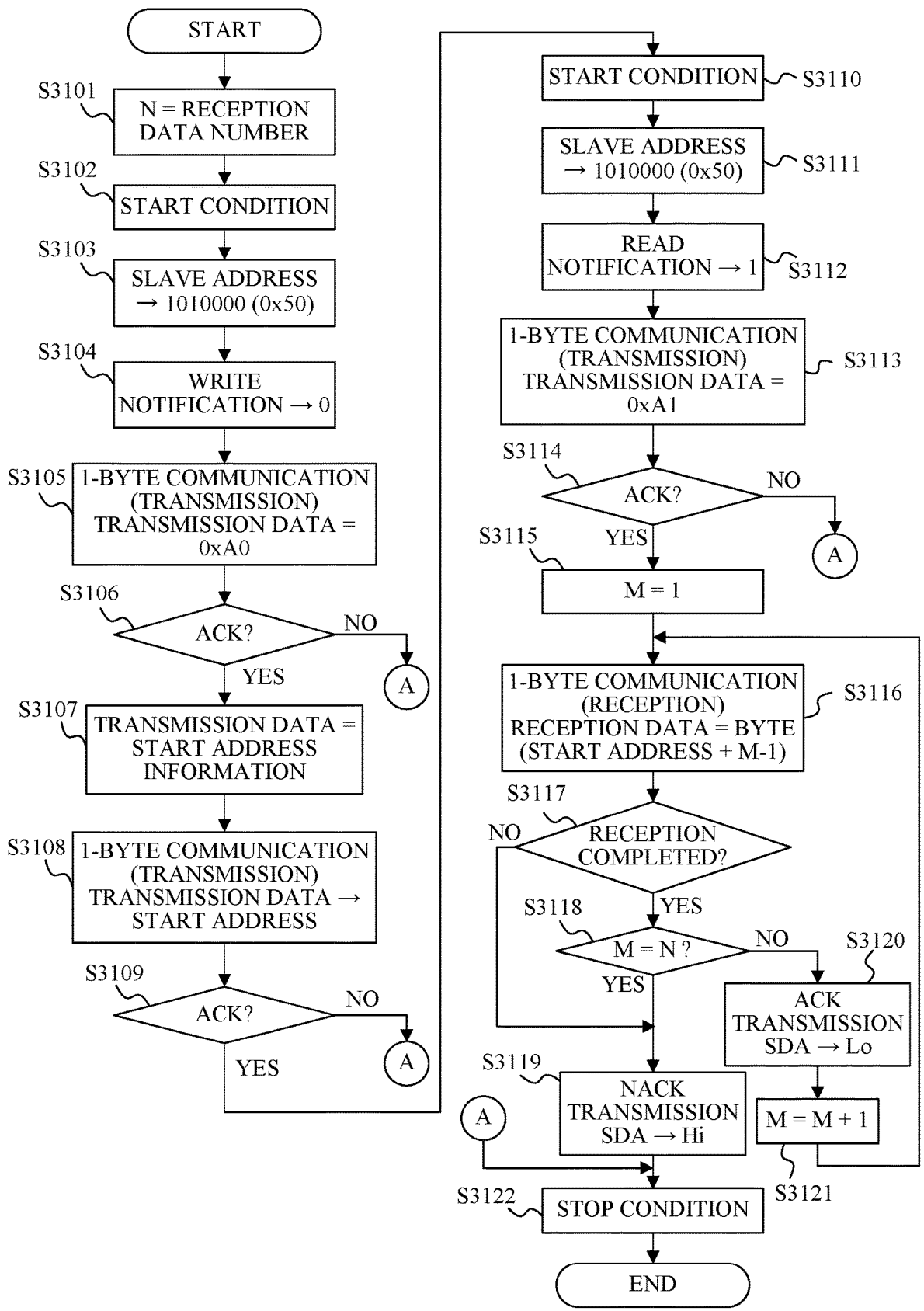
FIG. 21 illustrates processing to be performed by the camera when the camera receives N-byte data from the accessory in the first embodiment.

A flowchart in FIG. 21 illustrates processing to be performed by the camera control circuit A 101 when the camera control circuit A 101 receives N-byte data from the accessory control circuit 201.

In S3101, the camera control circuit A 101 stores a numerical value indicating the number of bytes to be received in internal variable N. For example, in the case where 3-byte data is received, 3 is stored. In this embodiment, 3 is stored.

In S3102 to S3106, the camera control circuit A 101 performs the same processing as S3002 to S3006, respectively, and thus a description thereof will be omitted.

In S3107, the camera control circuit A 101 sets to transmission data storage address information (start address information) of the data received from the accessory control circuit 201. In this embodiment, the size of the start address information is 1 byte, and the value is 0x00.

In S3108, the camera control circuit A 101 transmits the set 1-byte start address information (value 0x00) to the accessory control circuit 201.

In S3109, the camera control circuit A 101 outputs SCL for one clock and confirms the signal level of SDA after transmitting the 1-byte start address information data. In the case where the signal level of SDA is low, it is determined to be a data reception notification (ACK) from the accessory control circuit 201 and the flow proceeds to S3110. On the other hand, in the case where the signal level of SDA is high, it is determined that the accessory control circuit 201 has not normally received the data and the flow proceeds to S3122.

In S3110, the camera control circuit A 101 changes SDA to a low level while SCL is at a high level, and notifies the accessory control circuit 201 of the START condition, as in S3102.

In S3111, the camera control circuit A 101 sets slave address information indicating a slave address of the accessory control circuit 201 to the upper 7 bits of the transmission data. In this embodiment, assume that the slave address of the accessory control circuit 201 is 1010000 in binary.

In S3112, the camera control circuit A 101 sets the information indicating that it is read communication to the lower 1 bit of the transmission data. Setting this bit to 1 means read communication.

In S3113, the camera control circuit A 101 transmits to the accessory control circuit 201 data (10100001 in binary and 0xA1 in hexadecimal) that has been set as the transmission data in S3003 and S3004.

In S3114, the camera control circuit A 101 outputs SCL for one clock and confirms the signal level of SDA after transmitting the 1-byte data. In the case where the signal level of SDA is low, it is determined to be a data reception notification (ACK) from the accessory control circuit 201 and the flow proceeds to S3115. On the other hand, in the case where the signal level of SDA is high, it is determined that the accessory control circuit 201 has not normally received the data, and the flow proceeds to S3122.

In S3115, the camera control circuit A 101 stores 1 in internal variable M. The internal variable M is a variable for counting the number of reception data.

In S3116, the camera control circuit A 101 outputs 1-byte SCL and reads the signal level of SDA at a timing when SCL changes from a low level to a high level. This configuration enables the 1-byte data to be received from the accessory control circuit 201. The received 1-byte data can be stored in the volatile memory 125 or used for predetermined processing as data corresponding to the address 0x00.

In S3117, the camera control circuit A 101 determines whether or not 1-byte data has normally been received. In the case of the normal reception, the flow proceeds to S3118. Without the normal reception, the flow proceeds to S3119.

In S3118, the camera control circuit A 101 confirms whether the internal variable M has the same value as that of the internal variable N. If the internal variable M has the same value as that of the internal variable N, it is determined that the receptions of all data have been completed and the flow proceeds to S3119. If the internal variable M is not the same value as that of the internal variable N, it is determined that there are still data to be received and the flow proceeds to S3120.

In S3120, the camera control circuit A 101 provides the accessory control circuit 201 with a data reception notification (ACK) and notifies it of performing continuous data communication by outputting 1-byte SCL and by performing control for changing SDA to a low level.

In S3121, the camera control circuit A 101 adds 1 to the internal variable M and the flow returns to S3116.

Thus, after the flow returns to S3116, the camera control circuit A 101 sequentially increments the address of the data to be received, and receives 1-byte data corresponding to each address. In this way, the camera control circuit A 101 receives N-byte data from the accessory control circuit 201 by repeatedly receiving 1-byte data until the internal variable M and the internal variable N have the same value in the processing in S3118. In the case where the internal variable N is set to 3 as in this embodiment, 3-byte data can be received.

In S3119, the camera control circuit A 101 outputs 1-byte SCL and performs control for changing SDA to a high level to notify the accessory control circuit 201 that the data communication has been completed (NACK).

In S3122, the camera control circuit A 101 changes SDA to a high level while SCL is at the high level (STOP condition). Thereby, the accessory control circuit 201 is notified of a communication end.

Figure 22A:
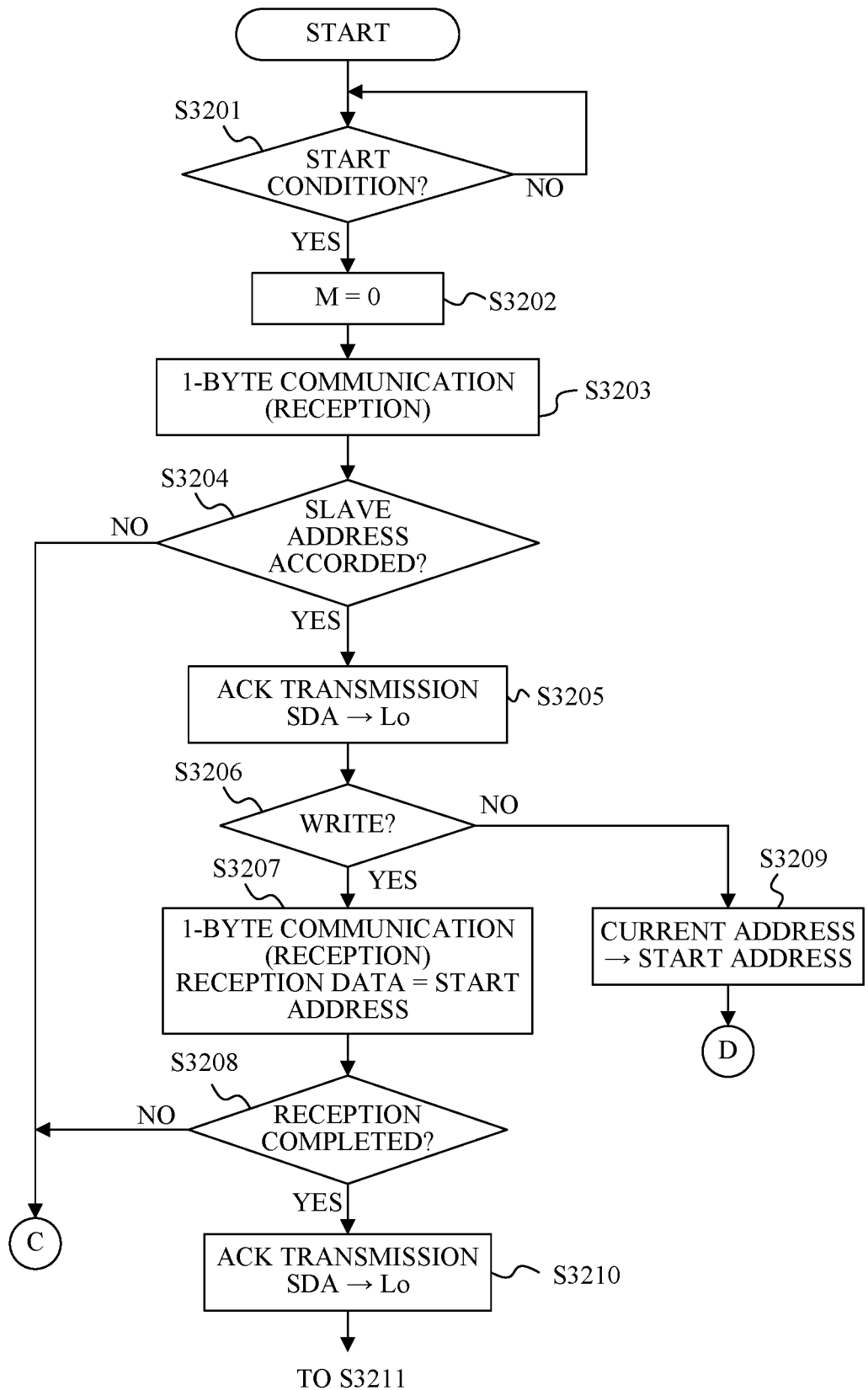
FIGS. 22A and 22B illustrate processing to be performed by the accessory when N-byte data is communicated between the camera and the accessory in the first embodiment.
Figure 22B:
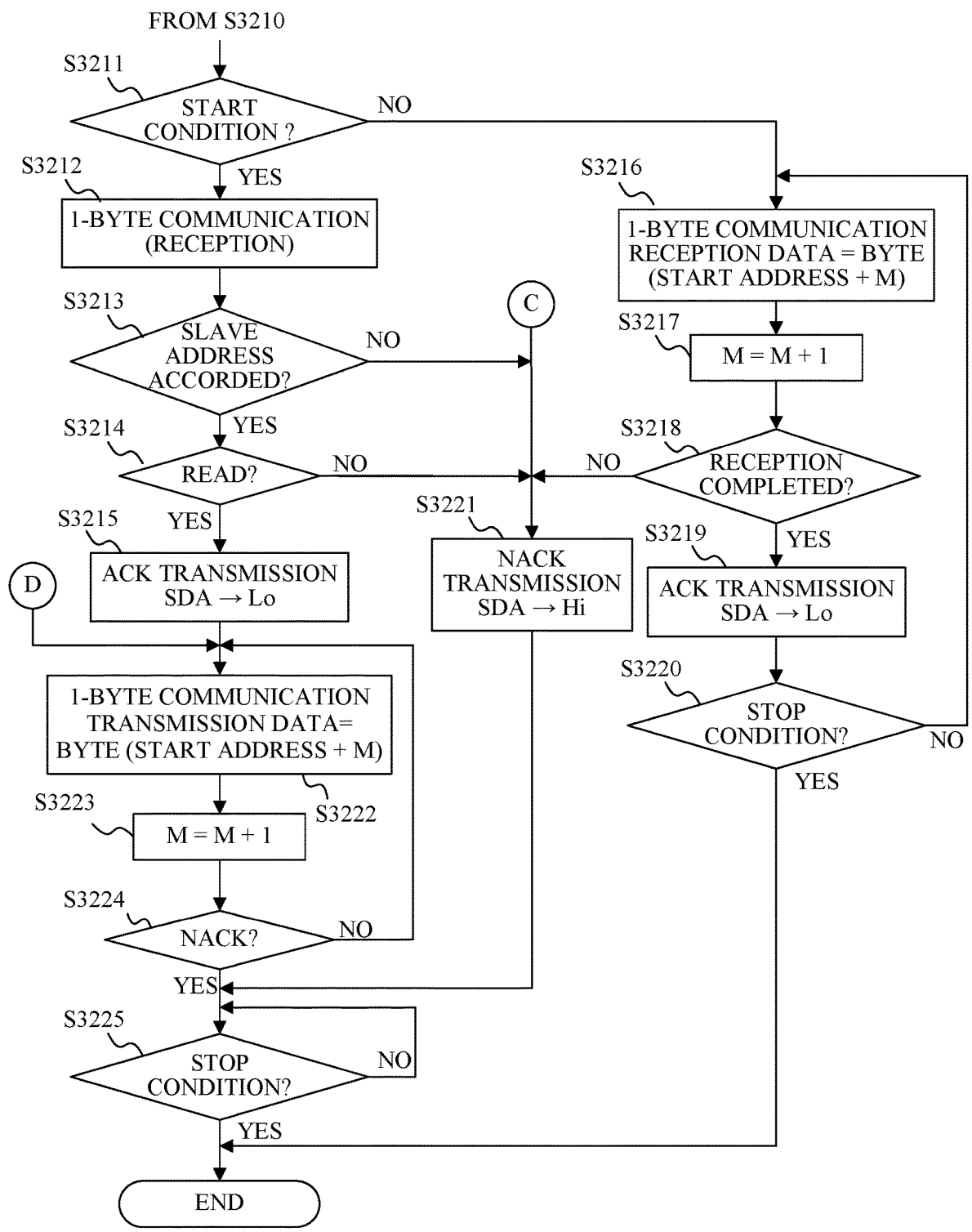

A flowchart in FIGS. 22A and 22B illustrates processing to be performed by the accessory control circuit 201 in the case where the camera control circuit A 101 transmits N-byte data to the accessory control circuit 201 and in the case where the camera control circuit A 101 receives N-byte data from the accessory control circuit 201.

In S3201, the accessory control circuit 201 waits for SDA to change to a low level (START condition) while SCL is at the high level. When the accessory control circuit 201 detects the START condition, the flow proceeds to S3202.

In S3202, the accessory control circuit 201 stores 0 in internal variable M. The internal variable M is a variable for counting the number of transmission data and the number of reception data.

In S3203, the accessory control circuit 201 receives 1-byte data transmitted from the camera control circuit A 101.

In S3204, the accessory control circuit 201 determines whether the upper 7-bit data of the 1-byte data received in S3203 accords with the slave address (0x50 in this embodiment) of the accessory control circuit 201. In the case where the address accords with the slave address of the accessory control circuit 201, the flow proceeds to S3205. In the case where the address does not accord with the slave address of the accessory control circuit 201, the flow proceeds to S3221.

In S3205, the accessory control circuit 201 provides a data reception notification (ACK) to the camera control circuit A 101 by performing control for changing SDA to a low level for the next SCL clock output after receiving the 1-byte data.

In S3206, the accessory control circuit 201 determines the type of data for the next 1-byte communication based on the lower 1-bit data of the 1-byte data received in S3203. In the case where the lower 1-bit data is 0, it is determined that the data of the next 1-byte communication is start address information from the camera control circuit A 101 to the accessory control circuit 201 and the flow proceeds to S3207. In the case where the lower 1-bit data is 1, it is determined that the data of the next 1-byte communication is transmission data from the accessory control circuit 201 to the camera control circuit A 101, and the flow proceeds to S3209.

In S3207, the accessory control circuit 201 receives 1-byte data transmitted from the camera control circuit A 101. The received 1-byte data is information indicating addresses in which data to be transmitted and received in the subsequent communication is stored. In this embodiment, assume that start address information is 0x00 as described with reference to FIGS. 20 and 21.

On the other hand, in S3209, the accessory control circuit 201 uses, for the start address information, address information previously stored in the accessory control circuit 201 or the address information previously notified from the camera control circuit A 101.

In S3208, in the case where the accessory control circuit 201 determines that the 1-byte data could normally be received, the flow proceeds to S3210. In the case where it is determined that the 1-byte data could not normally be received, the flow proceeds to S3221.

In S3210, the accessory control circuit 201 provides a data reception notification (ACK) to the camera control circuit A 101 by performing control for changing SDA to a low level for the next SCL clock output after receiving the 1-byte data.

In S3211, the accessory control circuit 201 confirms whether SDA has changed to the low level (START condition) while SCL is at a high level. In the case where the accessory control circuit 201 detects the START condition, the accessory control circuit 201 determines that 1-byte data to be communicated next is data to be transmitted from the camera control circuit A 101 to the accessory control circuit 201 and indicating a slave address and a communication type. Then, the flow proceeds to S3212. In the case where the accessory control circuit 201 does not detect the START condition, the accessory control circuit 201 determines that the 1-byte data to be communicated next is data information received by the accessory control circuit 201 from the camera control circuit A 101. Then, the flow proceeds to S3216.

In S3212, the accessory control circuit 201 receives the 1-byte data transmitted from the camera control circuit A 101.

In S3213, the accessory control circuit 201 determines whether the upper 7-bit data of the 1-byte data received in S3212 accords with the slave address (0x50 in this embodiment) of the accessory control circuit 201. In the case where the upper 7-bit data accords with the slave address of the accessory control circuit 201, the flow proceeds to S3214. In the case where the upper 7-bit data does not accord with the slave address of the accessory control circuit 201, the flow proceeds to S3221.

In S3214, the accessory control circuit 201 determines a data type for the next 1-byte communication based on the lower 1-bit data of the 1-byte data received in S3203. In the case where the lower 1-bit data is 0, the flow proceeds to S3221.

In the case where the lower 1-bit data is 1, it is determined that the data of the next 1-byte communication is transmission data from the accessory control circuit 201 to the camera control circuit A 101 and the flow proceeds to S3215.

In S3215, the accessory control circuit 201 provides a data reception notification (ACK) to the camera control circuit A 101 by performing control for changing SDA to a low level for the next SCL clock output after receiving the 1-byte data.

In S3222, the accessory control circuit 201 transmits to the camera control circuit A 101 1-byte data corresponding to the start address information received from the camera control circuit A 101 in S3207 or the start address information determined in S3209.

In S3223, the accessory control circuit 201 adds 1 to the internal variable M, and the flow proceeds to S3224.

In S3224, the accessory control circuit 201 confirms the signal level of SDA after transmitting the 1-byte data. In the case where the signal level of SDA is high, the camera control circuit A 101 determines that it is a notification (NACK) that all data has been received, and the flow proceeds to S3225. On the other hand, in the case where the signal level of SDA is high, it is determined that the camera control circuit A 101 continues to request a data transmission from the accessory control circuit 201, and the flow returns to S3222. Thus, after the flow returns to S3222, the accessory control circuit 201 sequentially increments the address of the data to be transmitted, and transmits 1-byte data corresponding to each address. Thus, by repeatedly transmitting the 1-byte data from the camera control circuit A 101 until NACK is notified in the processing in S3224, the accessory control circuit 201 transmits N-byte data to the camera control circuit A 101.

In S3225, the accessory control circuit 201 waits for a STOP condition in which the SDA changes to a high level while SCL is at a high level. When the accessory control circuit 201 detects the STOP condition, the communication is terminated.

On the other hand, in S3216, the accessory control circuit 201 receives 1-byte data, and stores the 1-byte data in an unillustrated nonvolatile memory as data corresponding to the start address information received from the camera control circuit A 101 in S3207 or uses it for predetermined processing.

In S3217, the accessory control circuit 201 adds 1 to the internal variable M and the flow proceeds to S3218.

In S3218, if the accessory control circuit 201 determines that 1-byte data could normally be received, the flow proceeds to S3219. If it is determined that the 1-byte data could not normally be received, the flow proceeds to S3221.

In S3219, the accessory control circuit 201 provides a data reception notification (ACK) to the camera control circuit A 101 by performing control for changing SDA to a low level for the next SCL clock output after receiving the 1-byte data.

In S3230, the accessory control circuit 201 confirms whether it has detected the STOP condition in which SDA changes to a high level while SCL is at a high level. In the case where the accessory control circuit 201 detects the STOP condition, the accessory control circuit 201 terminates the communication. On the other hand, in the case where the accessory control circuit 201 does not detect the STOP condition, the accessory control circuit 201 determines that data will be continuously transmitted from the camera control circuit A 101 to the accessory control circuit 201. Then, the flow returns to S3216.

Thus, after the flow returns to S3216, the accessory control circuit 201 sequentially increments an address of data to be received, and receives 1-byte data corresponding to each address. By repeatedly receiving the 1-byte data until the STOP condition is notified in S3220, the accessory control circuit 201 receives N-byte data from the camera control circuit A 101.

Thus, the camera connector 141 includes the contact TC12 for the data signal by the I2C communication method, the contact TC13 for the clock signal by the I2C communication method disposed on one side (adjacent to each other on one side) of the contact TC12 for the data signal. The camera connector 141 further includes the contact TC11 for the second input signal, the contact TC10 for the input selecting signal by the SPI communication method, the contact TC09 for reception by the SPI communication method, the contact TC08 for transmission by the SPI communication, the contact TC07 for the clock signal by the SPI communication method, the contact TC06 for the first input signal, and the contact TC05 for the output signal, which are disposed on the other side (in order from positions adjacent to each other on the other side) of the contact TC12 for the data signal.

The accessory 200 stores accessory information in an unillustrated nonvolatile memory. The accessory information is information for causing the camera 100 to identify the type of the accessory 200 and the specification relating to communication and operation (function) of the accessory 200. FIG. 5 illustrates an example of accessory information. The accessory information is mapped in the memory space at addresses 0x00 to 0x0F, and the accessory information can be read out of the accessory 200 by the I2C communication. Details of the accessory information will be described below. In the I2C communication according to this embodiment, a checksum value for read data is added as the final data of the communication.

An FNC1 signal connected to TC14 as the communication contact illustrated in FIG. 1, an FNC2 signal connected to TC15, an FNC3 signal connected to TC16, and an FNC4 signal connected to TC17 are functional signals whose function is variable according to the type of the attached accessory 200. For example, in the case where the accessory 200 is a microphone device, a signal communicated via TC15 is a signal relating to voice data, and in the case where the accessory 200 is a strobe device, a signal communicated via TC 14 is a signal that notifies the light emission timing.

A signal that realizes a different function may be communicated via the same contact depending on the type of the attached accessory. For example, in a case where the accessory 200 is an accessory other than an illumination device, a synchronization signal for controlling a timing different from a light emission timing may be communicated via TC14. TC14 to TC17 correspond to functional signal contacts. Communication using at least one of the functional signal contacts will be also referred to as functional signal communication. The functional signal communication can be executed at a timing independent of the I2C communication and SPI communication in parallel with the I2C communication and SPI communication.

The accessory type, as used herein, means the above microphone device, illumination device, etc. Accessories that achieve the same purpose, such as illuminations with different performances, belong to the same type of accessories. Accessories that achieve different purposes, such as a microphone device and an illumination device, are different types of accessories. The functional signal communication is executed based on information acquired by the I2C communication or the SPI communication. TC18 as a second ground contact is also connected to GND, and is a contact that serves as a reference potential for the camera 100 and the accessory 200, similarly to TC04. A differential signal D2N connected to TC19 and a differential signal D2P connected to TC20 are data communication signals in which they perform data communications in pairs, and are connected to the camera control circuit B 102. For example, USB communication can be performed via TC19 and TC20.

TC21 is connected to GND and can be used not only as a reference potential contact but also as a contact for controlling wiring impedances of the differential signals D2N and D2P. TC21 corresponds to a fourth ground contact.

The contacts TC01, TC04, TC06, TC18, and TC21 are connected to, for example, a GND portion of a flexible printed circuits (FPC) substrate, and the GND portion of the FPC substrate is fixed to a metallic member which serves as the GND level of the camera 100, with a screw or the like. The metallic member serving as the GND level includes, for example, an engagement member engageable with the accessory 200 in the accessory shoe portion, an unillustrated base plate inside the camera 100, and the like.

In this embodiment, the attachment detecting contact TC06 to which the accessory attachment detecting signal/ACC_DET is connected is disposed next to the contact (first clock contact) TC07 that transmits the clock signal SCLK (first clock signal). In general, noise (clock noise) associated with a potential fluctuation of a clock signal is transmitted to a contact adjacent to the contact of the clock signal, which may cause malfunction. In particular, this influence is significant in a configuration that has many contacts and a short distance between the contacts as in this embodiment. Accordingly, by disposing the attachment detecting contact TC06 next to the SCLK contact TC07, the influence of the clock noise can be suppressed.

The accessory attachment detecting signal/ACC_DET is pulled up before the accessory is attached, but is set to the GND potential after the accessory is attached. On the other hand, since the SCLK contact TC07 for transmitting the clock signal does not transmit the clock signal and the potential does not fluctuate before the accessory is attached. The potential fluctuates because the clock signal is transmitted only after the accessory is attached.

When the SCLK contact TC07 transmits a clock signal, the attachment detecting contact TC06 is at a GND potential. Therefore, even if the attachment detecting contact TC06 receives clock noise, the potentials of the control circuits of the camera 100 and the accessory 200 are less likely to fluctuate, so that malfunction can be prevented. In addition, the clock noise can be restrained from transmitting to a position farther than the attachment detecting contact TC06. As a result, it is unnecessary to provide a GND terminal, and thus the influence of clock noise can be suppressed without increasing the number of contacts.

SCL (second clock signal) as a clock signal is also transmitted to the contact (second clock contact) TC13. However, SCLK transmitted to the SCLK contact TC07 has a higher frequency than that of SCL, and the SCLK contact TC07 generates more clock noise than the SCL contact TC13. Therefore, disposing the attachment detecting contact TC06 next to the SCLK contact TC07 instead of next to the SCL contact TC13 is more effective in preventing malfunction caused by clock noise.

In addition to the difference in frequency, SCL transmitted by the SCL contact TC13 is a clock signal of an I2C communication standard, and a voltage fluctuation of a signal line is driven by the open-drain connection. On the other hand, SCLK transmitted by the SCLK contact TC07 is a clock signal of an SPI communication standard, and a voltage fluctuation of a signal line is driven by the CMOS output. Therefore, the SCL contact TC13 tends to have a gentler edge of the voltage fluctuation than that of the SCLK contact TC07, and clock noise is less likely to occur. Hence, disposing the attachment detecting contact TC06 next to the SCLK contact TC07 rather than next to the SCL contact TC13 is more effective in preventing malfunction caused by clock noise.

The differential signals DIN and DIP may be transmitted in pairs to the first and second differential signal contacts TC19 and TC20 to transmit the clock signal. In that case, a clock signal (third clock signal) having a higher frequency than those of the SCLK contact TC07 and the SCL contact TC13 may be transmitted. However, the differential signals DIN and DIP are pair signals, and thus the clock noise emission is less than those of the SCLK contact TC07 and the SCL contact TC13 that transmit single-ended signals. Therefore, it is more effective to prevent malfunction caused by the clock noise by disposing the attachment detecting contact TC06 next to the SCLK contact TC07 instead of next to the first and second differential signal contacts TC19 and TC20.

The contact (first data contact) TC08 disposed next to the SCLK contact TC07 on the opposite side of the attachment detecting contact TC06 transmits MOSI (first data signal). Since MOSI is a data signal, it appears that MOSI is susceptible to clock noise. However, MOSI is a data signal of the same SPI communication standard as the clock signal transmitted by the SCLK contact TC07, and thus the potential fluctuation timing is synchronized with the clock signal and is less likely to be affected by the clock noise. Therefore, the contact TC08 does not have to be fixed to the GND potential and can be used as the MOSI contact.

The accessory 200 has a battery 205 and receives power supply from the battery 205 and also receives power supply from the camera 100 via the camera connector 141 and the accessory connector 211. The accessory control circuit 201 as an accessory processing unit in the accessory 200 is a circuit that controls the entire accessory 200, and includes a processor (microcomputer) such as a CPU. The accessory control circuit 201 executes various controls and processing according to a computer program.

The accessory power supply circuit 202 is a circuit that generates a power supply for supplying power to each circuit in the accessory 200, and includes a DC/DC converter circuit, LDO, a charge pump circuit, and the like. A voltage of 1.8V generated by the accessory power supply circuit 202 is constantly supplied as accessory microcomputer power supply VMCU_A to the accessory control circuit 201. The voltage generated by the accessory power supply circuit 202 may be different from 1.8V. Control over the accessory power supply circuit 202 can provide turning-on and off control over the power supply to each circuit in the accessory 200.

A charging circuit (power-supplied unit) 204 is a circuit for charging the battery 205 using the electric power supplied from the camera 100. The accessory control circuit 201 controls the charging circuit 204 to charge the battery 205 in the case where the accessory control circuit 201 can determine that sufficient power is supplied from the camera 100 to perform a charging operation. In this embodiment, the battery 205 is attached to the accessory 200, but the accessory 200 may be operated only by a power supply from the camera 100 to the accessory power supply circuit (power-supplied unit) 202 without attaching the battery 205. In this case, the charging circuit 204 is unnecessary.

A differential communication circuit 207 is a circuit for performing differential communication with the camera 100, and can communicate data with the camera 100. An external communication IF circuit 208 is an IF circuit for performing data communication with an unillustrated external device, such as an Ethernet communication IF, a wireless LAN communication IF, and a public network communication IF. The accessory control circuit 201 controls the differential communication circuit 207 and the external communication IF circuit 208 to transmit data received from the camera 100 to the external device and data received from the external device to the camera 100.

The functional circuit 206 is a circuit having different functions depending on the type of the accessory 200. The functional circuit 206 is, for example, a light-emitting circuit, a charging circuit, or the like in the case where the accessory 200 is a strobe device. In the case where the accessory 200 is a microphone device, it is a voice codec circuit, a microphone circuit, or the like.

An external connection terminal 209 is a connector terminal for connection to an external device, and is a USB TYPE-C connector in this embodiment. A connection detecting circuit 210 is a circuit for detecting that an external device has been connected to the external connection terminal 209. The accessory control circuit 201 can detect the connection of the external device to the external connection terminal 209 by receiving an output signal of the connection detecting circuit 210.

A power supply switch 203 is a switch operable by the user to turn on and off the power supply (that is, operation) of the accessory 200. The accessory control circuit 201 can detect a turning-on position and a turning-off position by reading a signal level of a terminal to which the power supply switch 203 is connected.

An operation switch 212 is a switch operable by the user to give various instructions to the accessory 200 and to make various settings, and includes a button, a cross key, a slide switch, a dial switch, a touch sensor, and the like. When the operation switch 212 is operated, the accessory control circuit 201 detects the operation and executes predetermined processing according to the operation.

An accessory connector 211 is a connector electrically connectable to the camera 100 via 21 contacts TA01 to TA21 that are arranged in a row. The contacts TA01 to TA21 are arranged in this order from one end to the other end in the arrangement direction.

TA01 is connected to GND and serves not only as a reference potential contact but also as a contact for controlling wiring impedances of the differential signals D1N and D1P. TA01 corresponds to a third ground contact.

The differential signal D1N connected to TA02 and the differential signal D1P connected to TA03 are data communication signals in which they perform data communication in pairs, and are connected to the differential communication circuit 207. TA02, TA03, TA07 to TA10, TA12 to TA17, TA19 and TA20 described below are communication contacts.

TA04 as a first ground contact is connected to GND and serves as a reference potential contact for the camera 100 and the accessory 200. TA04 is disposed outside TA05 described below in the arrangement direction of the contacts.

The accessory power supply circuit 202 and the charging circuit 204 are connected to TA05 as a power supply contact, and the accessory power supply VACC supplied from the camera 100 is connected to TA05.

TA06 as an attachment detecting contact is directly connected to GND. When the accessory 200 is attached to the camera 100, the accessory control circuit 201 sets the accessory attachment detecting signal/ACC_DET described above to a low level (GND potential) as the active potential. Thereby, the camera 100 can detect the attachment of the accessory 200.

SCLK connected to TA07 as a communication contact, MOSI connected to TA08, MISO connected to TA09, and CS connected to TA10 are signals for the accessory control circuit 201 to act as a communication slave to perform SPI communication.

A communication request signal/WAKE for requesting communication from the accessory control circuit 201 to the camera 100 is connected to TA11 as a signal contact (communication request contact, first contact). When the accessory control circuit 201 determines that communication with the camera 100 is necessary, the accessory control circuit 201 request the camera 100 for communication by changing the communication request signal/WAKE from a high level to a low level.

When power is supplied from the camera control circuit 101 to the accessory 200 via TC5 in response to detecting an attachment of the accessory 200, the accessory control circuit 201 notifies the camera control circuit 101 that the power supply has been received by changing the signal level (by changing the potential) of the communication request signal/WAKE from a high level to a low level.

The accessory control circuit 201 can notify that there is a factor that causes the accessory 200 to communicate with the camera 100 by changing the signal level (potential) of the communication request signal/WAKE from a high level to a low level even if there is no request from the camera.

With this configuration, the camera control circuit 101 can omit an operation of periodically checking, through polling, whether or not the accessory 200 has a factor that requires communication. The accessory 200 can communicate with the camera 100 on a real-time basis when the communication requiring factor occurs.

SDA connected to TA12 as a communication contact and SCL connected to TA13 are signals for the accessory control circuit 201 to serve as a communication slave to perform I2C communication.

Thus, the accessory connector 211 includes the contact TA12 for the data signal by the I2C communication method and the contact TA13 for the clock signal by the I2C communication method, which are disposed on one side of the contact TA12 for the data signal (adjacent to the contact TA12 for the data signal on one side). The accessory connector 211 further includes, on the other side of the contact TA12 for the data signal (in order from a position adjacent to the contact TA12 for the data signal on the other side), the contact TA11 for the second input signal, the contact TA10 for the input selecting signal by the SPI communication method, the contact TA09 for transmission by the SPI communication method, the contact TA08 for reception by the SPI communication method, the contact TA07 for the clock signal by the SPI communication method, the contact TA06 for the first input signal, and the contact TA06 for the output signal.

An FNC1 signal connected to TA14 as a communication contact (functional signal contact), an FNC2 signal connected to TA15, an FNC3 signal connected to TA16, and an FNC4 signal connected to TA17 are functional signals whose functions are variable according to the type of accessory 200. For example, in the case where the accessory 200 is a microphone device, they can be signals relating to voice data, and in the case where the accessory 200 is a strobe device, they can be signals for notifying a light emission timing.

TA18 as a second ground contact is also connected to GND, and is a reference potential contact for the camera 100 and the accessory 200, similar to TA04. The differential signal D2N connected to TA19 and the differential signal D2P connected to TA20 are data communication signals in which they perform data communication in pairs, and are connected to the external connection terminal 209.

TA21 is connected to GND and can be used not only as a reference potential contact but also as a terminal for controlling the wiring impedances of the differential signals D2N and D2P. TA21 corresponds to a fourth ground contact.

The contacts TA01, TA04, TA06, TA18, and TA21 are connected to, for example, the GND portion of the FPC substrate, and the GND portion of the FPC substrate is fixed to a metallic member which serves as the GND level of the accessory 200, with an unillustrated screw. The metallic member serving as the GND level includes, for example, a shoe attachment leg engageable with the accessory shoe portion of the camera 100, an unillustrated base plate inside the accessory 200, and the like.

Figure 6:
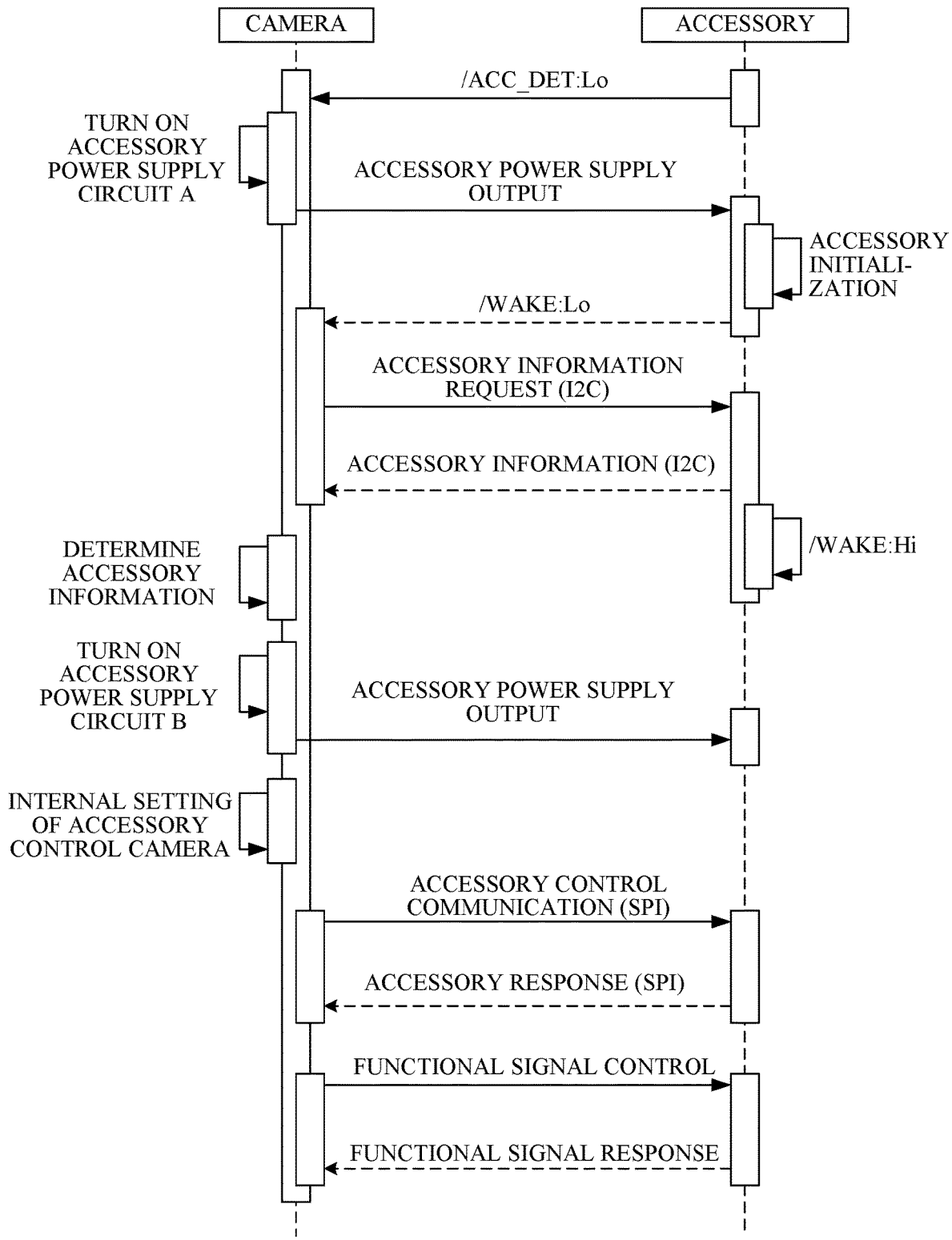
FIG. 6 illustrates a processing sequence of the camera system in the first embodiment.

FIG. 6 illustrates a processing sequence to be performed when the accessory 200 is attached to the camera 100. A description will now be given of a processing outline of each of the camera 100 (camera control circuits A 101 and B 102) and the accessory 200 (accessory control circuit 201), and details will be described below.

When the accessory 200 is attached to the camera 100, the accessory attachment detecting signal/ACC_DET becomes at a low level. Thereby, the camera control circuit A 101 determines that the accessory 200 is attached to the camera 100. The camera control circuit A 101 that has determined that the accessory 200 has been attached sets power supply control signal CNT_VACC1 to a high level in order to turn on the output of the accessory power supply circuit A 131. The accessory power supply circuit A 131 outputs the accessory power supply VACC when the power supply control signal CNT_VACC1 becomes at a high level.

The accessory power supply circuit 202 that has received VACC generates the power supply VMCU_A for the accessory control circuit 201. Thereby, the accessory control circuit 201 is started. The started accessory control circuit 201 initializes each block in the accessory 200. Thereafter, when the accessory control circuit 201 is ready to communicate with the camera 100, the accessory control circuit 201 sets the communication request signal/WAKE to a low level.

The camera control circuit A 101 detects that the accessory 200 is in a communicable state when the communication request signal/WAKE becomes at a low level. The camera control circuit A 101 requests the accessory 200 to communicate the accessory information by the I2C communication. The accessory control circuit 201 that has received the communication request for the accessory information transmits the accessory information to the camera control circuit A 101. The accessory control circuit 201 that has transmitted the accessory information sets the communication request signal/WAKE to a high level.

The camera control circuit A 101 determines whether or not the attached accessory is controllable based on the received accessory information. The camera control circuit A 101 turns on the accessory power supply circuit B 132. Then, the camera control circuit A 101 makes various settings for the camera 100, and when completing the settings, the camera control circuit A 101 notifies the camera control circuit B 102 of the accessory information.

The camera control circuit B 102 notifies the accessory 200 of a control command (accessory control communication) or performs control corresponding to a functional signal (functional signal control) by the SPI communication based on the notified accessory information. That is, the camera control circuit B 102 controls the accessory 200 by the SPI communication.

The accessory control circuit 201 responds to the control command by the SPI communication from the camera 100 and is operated in accordance with the functional signal.

A description will now be given of the accessory information illustrated in FIG. 5. D7-D0 data at address 0x00 is information indicating a type of the accessory (referred to as accessory type information hereinafter). FIG. 7 illustrates an example of accessory type information. For example, 0x81 indicates a strobe device, 0x82 indicates an interface conversion adapter device, 0x83 indicates a microphone device, and 0x84 indicates a multi-accessory connection adapter device for attaching a plurality of accessory devices to the camera 100.

The adapter device is an intermediate accessory attached between the camera 100 and the accessory such as a strobe device and a microphone device. The interface conversion adapter device is an adapter device that converts the interface so as to provide compatibility between the camera 100 and the accessory when the interface of the camera 100 and the interface of the accessory are different. The multi-accessory connection adapter device is an adapter device to which a plurality of accessories are attachable.

D7-D0 data at address 0x01 in FIG. 5 is information indicating a model (type) of the accessory 200 (referred to as accessory type information hereinafter). The type and model type of the accessory can be identified by the accessory type information described above and this information.

D7-D0 data at address 0x02 is information indicating a firmware version of the accessory 200.

D7-D6 data at address 0x03 is specification information (referred to as power-off power supply necessity/unnecessity information hereinafter) indicating whether or not a (power) supply of the accessory power supply VACC to the accessory 200 is to be requested in a power-off state (first power-saving state) in which an unillustrated power supply switch of the camera 100 is turned off. In the case where the information is 0, no power supply is requested. In the case where the information is 1, a power supply is requested by the accessory power supply circuit A 131. In the case where the information is 2, a power supply is requested by the accessory power supply circuit B 132.

D5-D4 data at address 0x03 is specification information (referred to as automatic power-off power supply necessity/ unnecessity information hereinafter) indicating whether or not to request the accessory 200 for a supply of the accessory power supply VACC when the camera 100 is in a power-saving state (referred to as an automatic power-off state hereinafter; second power-saving state) by an automatic power-off function. The camera 100 has the automatic power-off function that automatically turns off power when a non-operating state in which no operation is performed continues for a predetermined time for saving power. In the case where the information is 0, it means that no power supply is required. In the case where the information is 1, it means that there is a power supply requested by the accessory power supply circuit A 131. In the case where the information is 2, it means that there is a power supply requested by the accessory power supply circuit B 132.

D3-D2 data at address 0x03 is specification information indicating whether or not the accessory 200 has the battery 205. In the case where the information is 0, it means that the accessory 200 has no battery, and in the case where the information is 1, it means that the accessory 200 has the battery.

D1-D0 data at address 0x03 is specification information (referred to as charging support information hereinafter) indicating whether or not the accessory 200 has a charging function for the battery 205. In the case where the information is 0, it means that the accessory 200 has no charging function, and in the case where it is 1, it means that the accessory 200 has the charging function.

D7-D0 data at address 0x04 is specification information indicating the required power to the accessory power supply VACC with which the accessory 200 is supplied from the camera 100. For example, a value obtained by multiplying this information by 10 indicates a current value. In a case where this information is 10, it means 100 mA, and in a case where this information is 100, it means 1 A. In order to reduce an information amount of this information, this information may be simply associated with a current value. For example, in the case where this information is 0, it may mean 100 mA, in the case where this information is 1, it may mean 300 mA, in the case where this information is 3, it may mean 450 mA, and in the case where this information is 4, it may mean 600 mA.

D7 data at address 0x05 is specification information indicating whether or not the accessory 200 is in a firmware update mode. In the case where the information is 0, it means that the accessory 200 is not in the firmware update mode, and in the case where it is 1, it means that the accessory 200 is in the firmware update mode.

D6 data at address 0x05 is specification information indicating whether or not the accessory 200 has a firmware update function. In the case where the information is 0, it means that the accessory 200 does not have the firmware update function. In the case where the information is 1, it means that the accessory 200 has the firmware update function.

D5-D4 data at address 0x05 is specification information indicating whether or not an operation of the accessory 200 that is attached to an intermediate (connection) accessory is to be permitted. In the case where the information is 0, it means that the operation is not permitted, and in the case where it is 1, it means that the operation is permitted.

D3-D2 data at address 0x05 is specification information indicating whether or not the accessory 200 needs the camera 100 to confirm an attachment of an intermediate accessory when the camera 100 is started. In the case where the information is 0, it means that the confirmation is unnecessary, and in the case where it is 1, it means that the confirmation is necessary.

D1-D0 data at address 0x05 is specification information indicating whether or not the accessory 200 supports a command notification by the I2C communication. In the case where this information is 0, it means that the command notification is not supported, and in the case where it is 1, it means that the command notification is supported.

D5-D4 data at address 0x06 is specification information indicating a communication request factor acquiring method (used communication method: referred to as a factor acquiring method hereinafter) as a communication method that can be used to notify the camera 100 of a generating factor of a communication request after the accessory 200 notifies the camera 100 of communication request signal/WAKE. In the case where the information is 0, it means that the I2C communication method is the factor acquiring method. In the case where the information is 1, it means that the SPI communication method is the factor acquiring method. In the case where the information is 2, it means that each of the I2C communication method and the SPI communication method is the factor acquiring method.

D3-D0 data at address 0x06 is specification information indicating whether or not the accessory 200 has functions corresponding to the FNC1 signal (functional signal 1), the FNC2 signal (functional signal 2), the FNC3 signal (functional signal 3), and the FNC4 signal (functional signal 4). D0 data corresponds to the FNC1 signal, D1 data corresponds to the FNC2 signal, D2 data corresponds to the FNC3 signal, and D3 data corresponds to the FNC4 signal. In the case where the value is 0, it means that the accessory 200 does not have that function. In the case where the value is 1, the accessory 200 has that function.

D7 data at address 0x0A is specification information indicating whether or not the accessory 200 requests the camera 100 for a start when the accessory 200 notifies the camera 100 of the communication request signal/WAKE. In the case where the information is 0, it means that the start is requested, and in the case where it is 1, it means that the start is not requested.

D6-D0 data at address 0x0A is information indicating a generating factor of the communication request signal/ WAKE of which the accessory 200 notifies the camera 100.

FIG. 8 illustrates examples of generating factors of the communication request signal/WAKE (also referred to as a communication request factor hereinafter). Here, an example is illustrated in the case where the accessory 200 is a microphone device. For example, a factor number 0x00 is a number indicating that a menu call switch in the operation switch 212 has been operated (pressed). A factor number 0x01 is a number indicating that the accessory 200 has completed an output control of an audio signal. A factor number 0x02 is a number indicating that the accessory 200 has completed mute processing of an audio signal (unmuted). As described above, in this embodiment, information on the communication request factor (number) as the information on the generating factor of the communication request signal/WAKE can be notified (transmitted) from the accessory 200 to the camera 100 as the accessory information.

In FIG. 5, D1 data at address 0x0C is specification information indicating an SPI communication protocol supported by the accessory 200, and in the case where the information is 0, it means that the accessory 200 supports SPI protocol A, and in the case where it is 1, it means that the accessory 200 supports SPI protocol B.

D0 data at address 0x0C is specification information indicating a CS control logic of the SPI communication supported by the accessory 200. In the case where the information is 0, it means that CS is a low-active logic, and in the case where it is 1, it means that CS is a high-active logic.

D7-D0 data at address 0x0D is specification information indicating the time required as a communication byte interval in the case where the accessory 200 performs communication in accordance with the SPI protocol A and the D7 data at the address 0x05 is 0 or the accessory 200 is not in the firmware update mode.

D7-D0 data at address 0x0E is specification information indicating the time required as a communication byte interval when the accessory 200 performs communication in accordance with the SPI protocol A and the data at the address 0x05D7 is 1 or the accessory 200 is in the firmware update mode.

FIGS. 9A and 9B illustrate the time (communication interval) of the communication byte interval corresponding to the data (0 to 7) at the addresses 0x0D and 0x0E. FIG. 9A illustrates the communication interval for the data at the address 0x0D, and FIG. 8B illustrates the communication interval for the data at the address 0x0E.

In FIG. 5, data at address 0x0F is data of a checksum value indicating a sum of the values at the addresses 0x00 to 0x0E.

Figure 10:
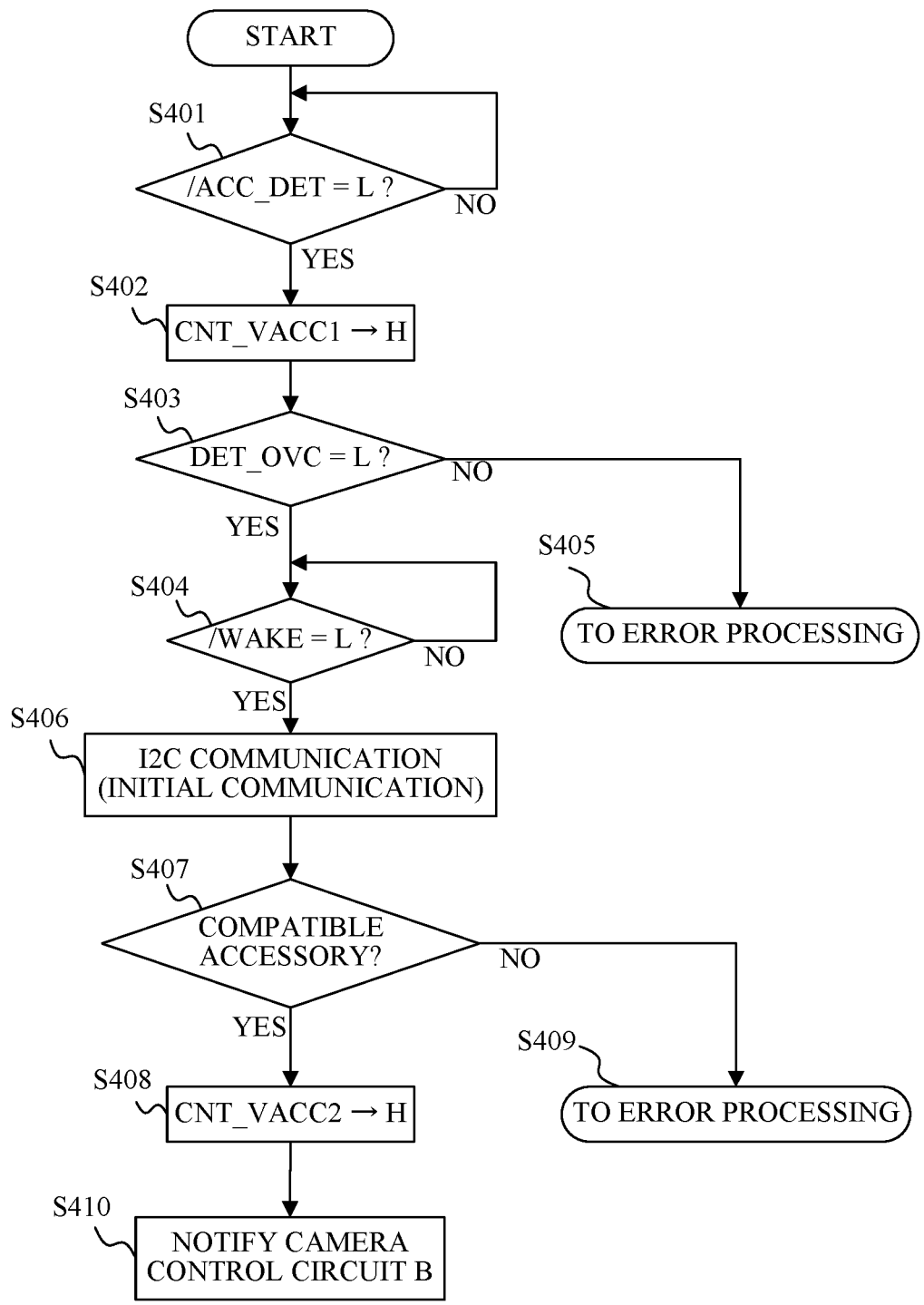
FIG. 10 illustrates a flowchart showing start processing to be performed by the camera (camera control circuit A) in the first embodiment.

FIG. 10 illustrates start processing to be executed by the camera control circuit A 101 until the accessory 200 is attached to the camera 100 and functions of the accessory 200 are enabled.

In S401, the camera control circuit A 101 monitors a signal level of the accessory attachment detecting signal/ACC_DET, and determines (detects) whether or not the accessory 200 is attached. If the signal level of the accessory attachment detecting signal/ACC_DET is high, the camera control circuit A 101 determines that the accessory 200 is not attached and the flow returns to S401. Therefore, the camera control circuit A 101 again determines whether the accessory 200 is attached. If the signal level is low, the camera control circuit A 101 determines that the accessory 200 is attached, and the flow proceeds to S402.

In S402, the camera control circuit A 101 performs control for changing the power supply control signal CNT_VACC1 to a high level in order to turn on the output of the accessory power supply circuit A 131. Then, the flow proceeds to S403. The accessory power supply circuit A 131 outputs the accessory power supply VACC when the power supply control signal CNT_VACC1 is at the high level.

In S403, the camera control circuit A 101 monitors a signal level of the overcurrent detecting signal DET_OVC and determines whether or not an overcurrent is flowing. If the signal level of DET_OVC is low, the camera control circuit A 101 determines that no overcurrent is flowing and the flow proceeds to S404, and if the signal level is high, the camera control circuit A 101 determines that the overcurrent is flowing, and the flow proceeds to S405 to perform error processing.

In S404, the camera control circuit A 101 monitors a signal level of the communication request signal/WAKE as a notification signal from the accessory 200, and determines whether or not an initialization of the accessory 200 has been completed. The camera control circuit A 101 determines that the initialization has been completed if the signal level of the communication request signal/WAKE is low (active), and the flow proceeds to S406. If the signal level is high, the camera control circuit A 101 determines that the initialization has not yet been completed and the flow returns to S404, so that the camera control circuit A 101 again determines whether the initialization has been completed.

In S406, the camera control circuit A 101 performs the I2C communication with the accessory 200 as the initial communication, and reads out 15-byte accessory information. Then, the flow proceeds to S407.

In S407, the camera control circuit A 101 determines whether or not the attached accessory 200 is a compatible device (compatible accessory) with the camera 100 based on the accessory information read out in S406. When the camera control circuit A 101 determines that the attached accessory 200 is the compatible accessory, the flow proceeds to S408, and when the camera control circuit A 101 determines that the attached accessory 200 is not the compatible accessory, the flow proceeds to S409 to perform error processing.

In S408, the camera control circuit A 101 performs control for changing the power supply control signal CNT_VACC2 to a high level in order to turn on the output of the accessory power supply circuit B 132. Then, the flow proceeds to S410. The accessory power supply circuit B 132 outputs the accessory power supply VACC when the power supply control signal CNT_VACC2 is at the high level. In this embodiment, when both the power supply control signals CNT_VACC1 and CNT_VACC2 are at high levels, the output from the accessory power supply circuit B 132 is supplied to the accessory power supply VACC.

In S410, the camera control circuit A 101 notifies the camera control circuit B 102 of the accessory information read out in S406. Thereby, the start processing of the camera 100 in response to the attachment of the accessory 200 is completed.

Figure 11:
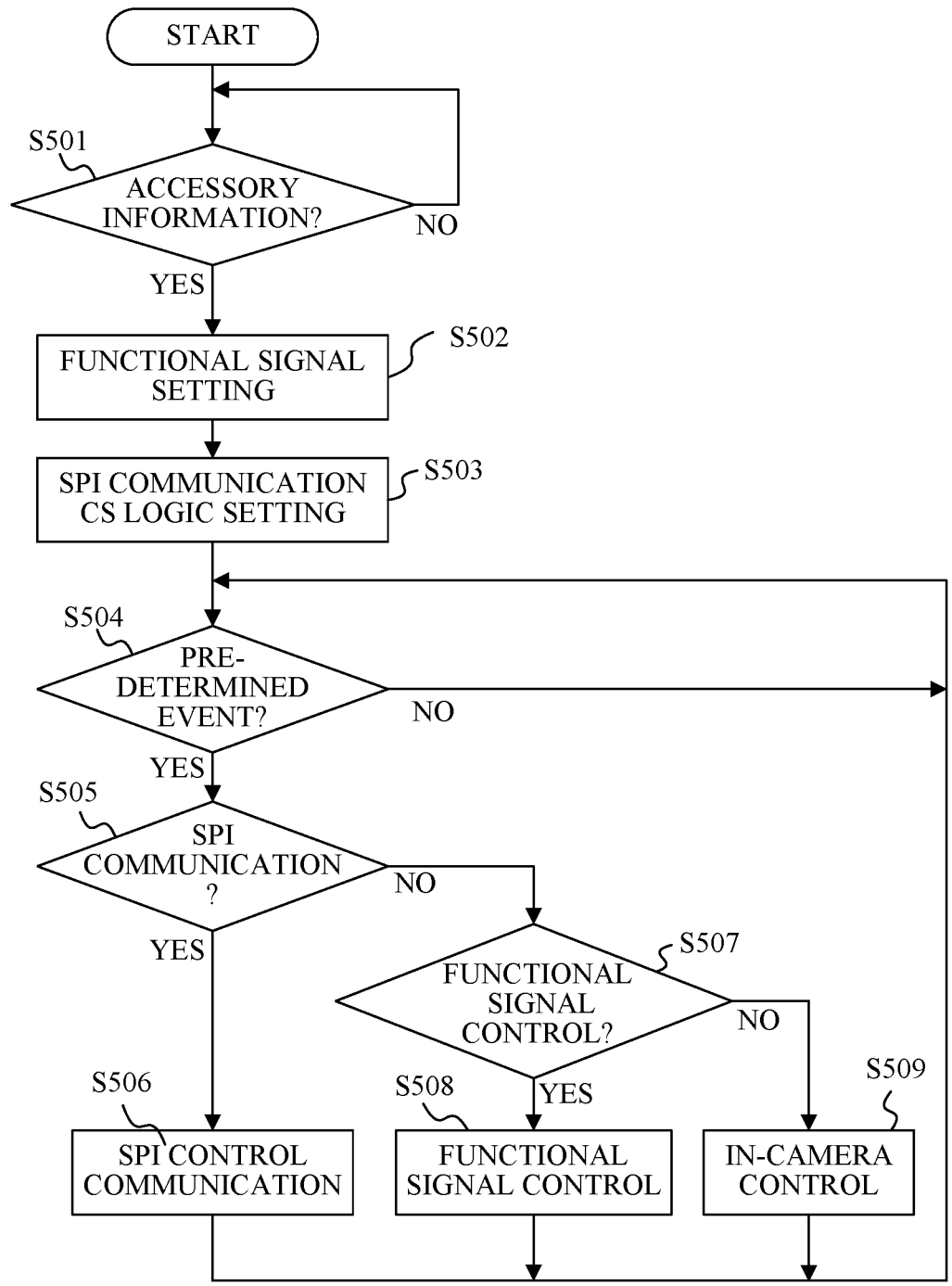
FIG. 11 illustrates a flowchart showing start processing to be performed by the camera (camera control circuit B) in the first embodiment.

A flowchart in FIG. 11 illustrates enabling processing to be executed by the camera control circuit B 102 until the accessory 200 is attached to the camera 100 and the functions of the accessory 200 are enabled.

In S501, the camera control circuit B 102 determines whether or not the accessory information has been notified from the camera control circuit A 101. If the accessory information has not yet been notified, the flow returns to S501 and the camera control circuit B 102 again determines whether or not the accessory information has been notified. If the accessory information has been notified, the flow proceeds to S502.

In S502, the camera control circuit B 102 sets the functional signals FNC1 to FNC4 based on the accessory information notified from the camera control circuit A 101. For example, in the case where it is notified that the accessory

200 is a microphone device, FNC1 is set to function as voice data clock signal BCLK, FNC2 is set to function as voice data channel signal LRCLK, and FNC3 is set to function as voice data signal SDAT. As another example, in the case where it is notified that the accessory 200 is a strobe device, FNC 4 is set to function as strobe emission synchronization signal XOUT. For functional signals that do not require control over the accessory 200, predetermined settings are made so as not to interfere with the operations of the camera 100 and the accessory 200.

In S503, the camera control circuit B 102 sets the CS control logic in SPI communication based on the accessory information notified from the camera control circuit A 101.

In S504, the camera control circuit B 102 determines whether or not a predetermined event for the accessory 200 has occurred. If no event has occurred, the flow returns to S504 and the camera control circuit B 102 again determines whether or not the event has occurred. If the event has occurred, the flow proceeds to S505.

In S505, the camera control circuit B 102 determines whether the event determined in S504 is an event that requires the SPI communication with the accessory 200. The flow proceeds to S506 if the event requires the SPI communication, and the flow proceeds to S507 otherwise.

In S507, the camera control circuit B 102 determines whether or not the event determined in S504 is an event that requires control over the accessory 200 using the functional signal. The flow proceeds to S508 if the event requires the control using the functional signal, and the flow proceeds to S509 otherwise.

In S506, the camera control circuit B 102 performs the SPI communication with the accessory 200. The SPI communication performed here includes, for example, communication of an instruction to turn on the microphone operation, communication of an instruction to turn off the microphone operation, communication of an instruction to switch a sound collection directivity of the microphone, communication of an instruction to switch an equalizer function of the microphone, and the like in the case where the accessory 200 is a microphone device. In the case where the accessory 200 is a strobe device, the SPI communication includes communication for reading out setting information on the strobe device, communication for notifying the strobe device of the setting information, and the like. When the SPI communication in S506 is completed, the flow returns to S504 and the camera control circuit B 102 again determines whether or not the event has occurred.

In S508, the camera control circuit B 102 controls the accessory 200 using a functional signal. For example, in the case where the accessory 200 is a microphone device, the camera control circuit B 102 outputs the audio data clock signal BCLK of FNC1 and the audio data channel signal LRCLK of FNC2, and takes in the audio data signal SDAT of FNC3. Thereby, the camera 100 can acquire voice data from the microphone device. In the case where the accessory 200 is a strobe device, the camera control circuit B 102 outputs the strobe emission synchronization signal XOUT of FNC 4 at a predetermined timing. Thereby, the camera 100 can instruct the strobe device on light emission. When the control using the functional signal is completed in this way, the flow returns to S504 and the camera control circuit B 102 again determines whether or not the event has occurred.

In S509, the camera control circuit B 102 performs predetermined in-camera control according to the event determined in S504. The in-camera control includes, for example, control for starting or ending recording of voice data in the recording memory 126, control for performing equalizer processing for the voice data, and the like, in the case where the accessory 200 is a microphone device. In the case where the accessory 200 is a strobe device, the in-camera control includes photometric control for accumulating and acquiring light emitted by the strobe device using the image sensor 122, control for calculating an indicated value of a light emission amount of the strobe device, and the like. When the in-camera control is thus completed, the flow returns to S504 and the camera control circuit B 102 again determines whether or not the event has occurred.

By the start processing by the camera control circuit A 101 and the enabling processing by the camera control circuit B 102 described above, it is possible to control the accessory 200 that has been attached to the camera 100.

Figure 12:
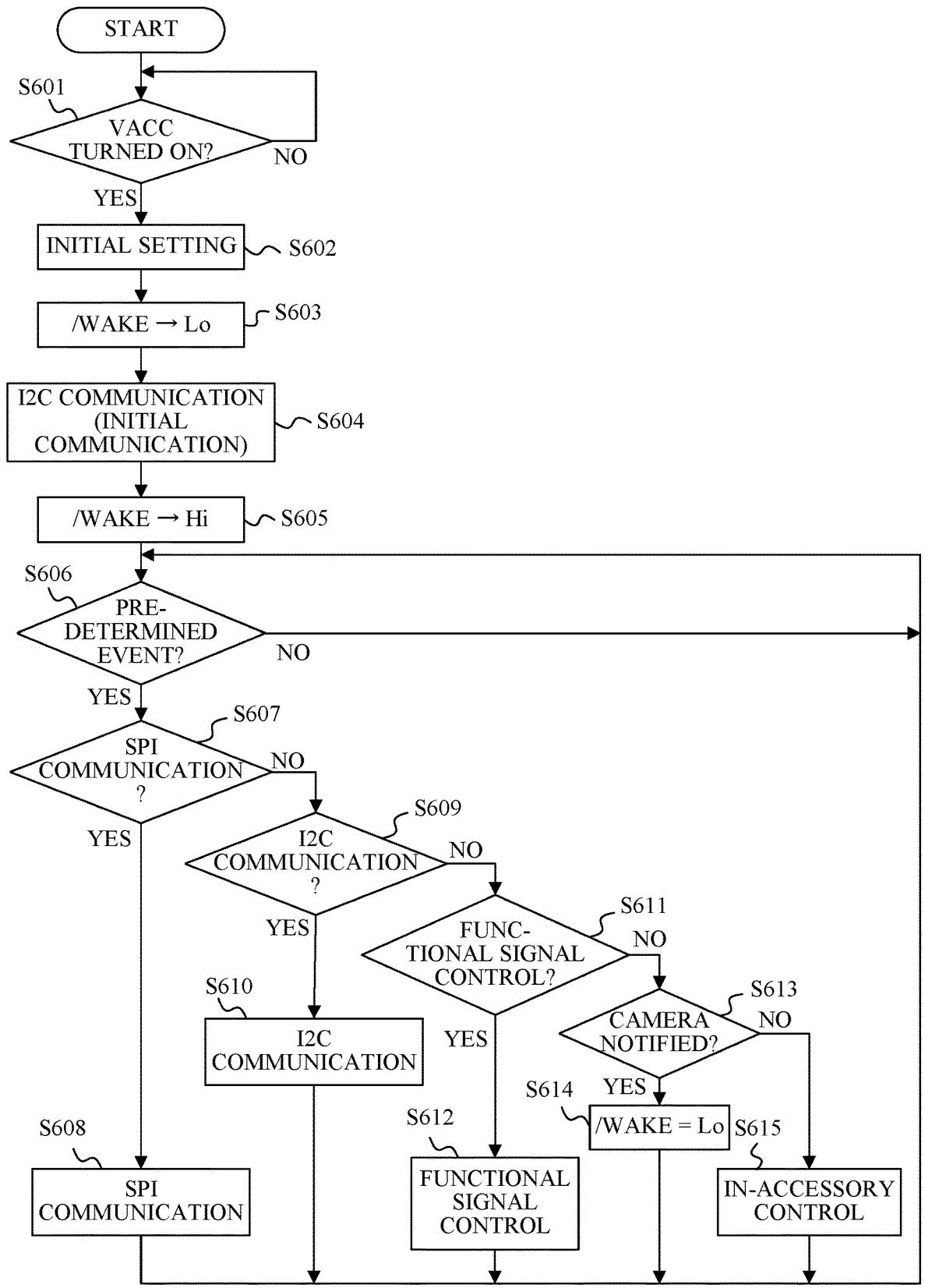
FIG. 12 illustrates a flowchart showing processing to be performed by the accessory in the first embodiment.

A flowchart in FIG. 12 illustrates processing to be executed by the accessory control circuit 201 from when the accessory 200 is attached to the camera 100 to when various functional operations of the accessory 200 are enabled.

In S601, the accessory control circuit 201 waits for the accessory power supply VACC from the camera 100 to be turned on. In the case where the accessory 200 has no battery 205, turning on of the accessory power supply VACC is detectable when power is supplied to the accessory control circuit 201 and the operation of the accessory control circuit 201 itself is started. In the case where the accessory 200 has the battery 205, the accessory control circuit 201 may monitor the voltage value of the accessory power supply VACC to detect that the accessory power supply VACC is turned on.

In S602, the accessory control circuit 201 makes a predetermined initial setting. For example, the accessory control circuit 201 sets an operating frequency of the microcomputer, an input/output control port of the microcomputer, initialization of a timer function of the microcomputer, and initialization of an interrupt function of the microcomputer.

When the initial setting in S602 is completed, in S603, the accessory control circuit 201 performs control for changing the communication request signal/WAKE to a low level. Thereby, the camera 100 is notified that the initial setting is completed.

In S604, the accessory control circuit 201 responds to the I2C communication from the camera 100 and transmits 15-byte accessory information to the camera 100 as the initial communication. The accessory information includes various information illustrated in FIG. 5.

When the initial communication of S604 is completed, in S605, the accessory control circuit 201 controls the communication request signal/WAKE to a high level.

In S606, the accessory control circuit 201 determines whether or not a predetermined event has occurred. If no event has occurred, the flow returns to S606 and the accessory control circuit 201 again determines whether or not the event has occurred, and if the event has occurred, the flow proceeds to S607.

In S607, the accessory control circuit 201 determines whether or not the event determined in S606 is an event that requires the SPI communication with the camera 100. The flow proceeds to S608 if the event requires SPI communication, and the flow proceeds to S609 otherwise.

In S609, the accessory control circuit 201 determines whether or not the event determined in S606 is an event that requires the I2C communication with the camera 100. The flow proceeds to S610 if the event requires the I2C communication, and the flow proceeds to S611 otherwise.

In S611, the accessory control circuit 201 determines whether or not the event determined in S606 is an event that requires control using a functional signal. The flow proceeds to S612 if the event requires the control using the functional signal, and the flow proceeds to S613 otherwise.

In S613, the accessory control circuit 201 determines whether or not the event determined in S606 is an event that requires a notification to the camera 100 by the communication request signal/WAKE. The flow proceeds to S614 if the event requires a notification to the camera 100 by the communication request signal/WAKE, and the flow proceeds to S615 otherwise.

In S608, the accessory control circuit 201 performs the SPI communication with the camera 100. In the case where the communication request signal/WAKE is at a low level when the accessory control circuit 201 executes the SPI communication, the accessory control circuit 201 performs control for changing the communication request signal/WAKE to a high level after the SPI communication. The SPI communication performed here includes, for example, communication of an instruction to turn on a microphone operation from the camera 100, communication of an instruction to turn off the microphone operation, and communication of an instruction to switch a sound collection directivity of the microphone, in the case where the accessory 200 is a microphone device. The SPI communication further includes communication of an instruction to switch an equalizer function of the microphone. In the case where the accessory 200 is a strobe device, the SPI communication includes communication for reading out setting information on the strobe device, communication for notifying the strobe device of the setting information, and the like. When the predetermined SPI communication in S608 is completed, the flow returns to S606 and the accessory control circuit 201 again determines whether or not the event has occurred.

In S610, the accessory control circuit 201 performs the I2C communication with the camera 100. In the case where the communication request signal/WAKE is at a low level when the I2C communication is executed, control for changing the communication request signal/WAKE into a high level is made after the I2C communication. The I2C communication performed here includes, for example, communication for reading out a communication request factor (number) for the communication request signal/WAKE of which the accessory control circuit 201 has notified the camera 100. When the I2C communication in S610 is completed, the flow returns to S606 and the accessory control circuit 201 again determines whether or not the event has occurred.

In S612, the accessory control circuit 201 controls the camera 100 using a functional signal. The control performed here includes, for example, reception control of the audio data clock signal BCLK of FNC1 and the audio data channel signal LRCLK of FNC2 output from the camera 100, in the case where the accessory 200 is a microphone device. The control further includes output control of the voice data signal SDAT of FNC3 in synchronization with these signals. In the case where the accessory 200 is a strobe device, the control includes reception control of the strobe emission synchronization signal XOUT of FNC4 and corresponding strobe emission control. When the control using the functional signal in S612 is completed, the flow returns to S606 and the accessory control circuit 201 again determines whether or not the event has occurred.

In S614, the accessory control circuit 201 stores a communication request factor number to the camera 100 in response to the event determined in S606 in an unillustrated volatile memory of the accessory 200, and performs control for changing the communication request signal/WAKE to a low level. The communication request factor number is a unique number assigned to each factor content as illustrated in FIG. 8. When the low-level control of the communication request signal/WAKE in S614 is completed, the flow returns to S606 and the accessory control circuit 201 again determines whether the event has occurred.

In S615, the accessory control circuit 201 performs in-accessory control according to the event determined in S606. The in-accessory control performed here includes detecting control of a remaining battery level, detecting control of an operation of the operation switch 212, and the like, in the case where the accessory 200 includes the battery 205. When the in-accessory control in S615 is completed, the flow returns to S606 and the accessory control circuit 201 again determines whether the event has occurred.

By the above processing by the accessory control circuit 201, the accessory 200 can perform various functional operations after the accessory 200 is attached to the camera 100.

Figure 13:
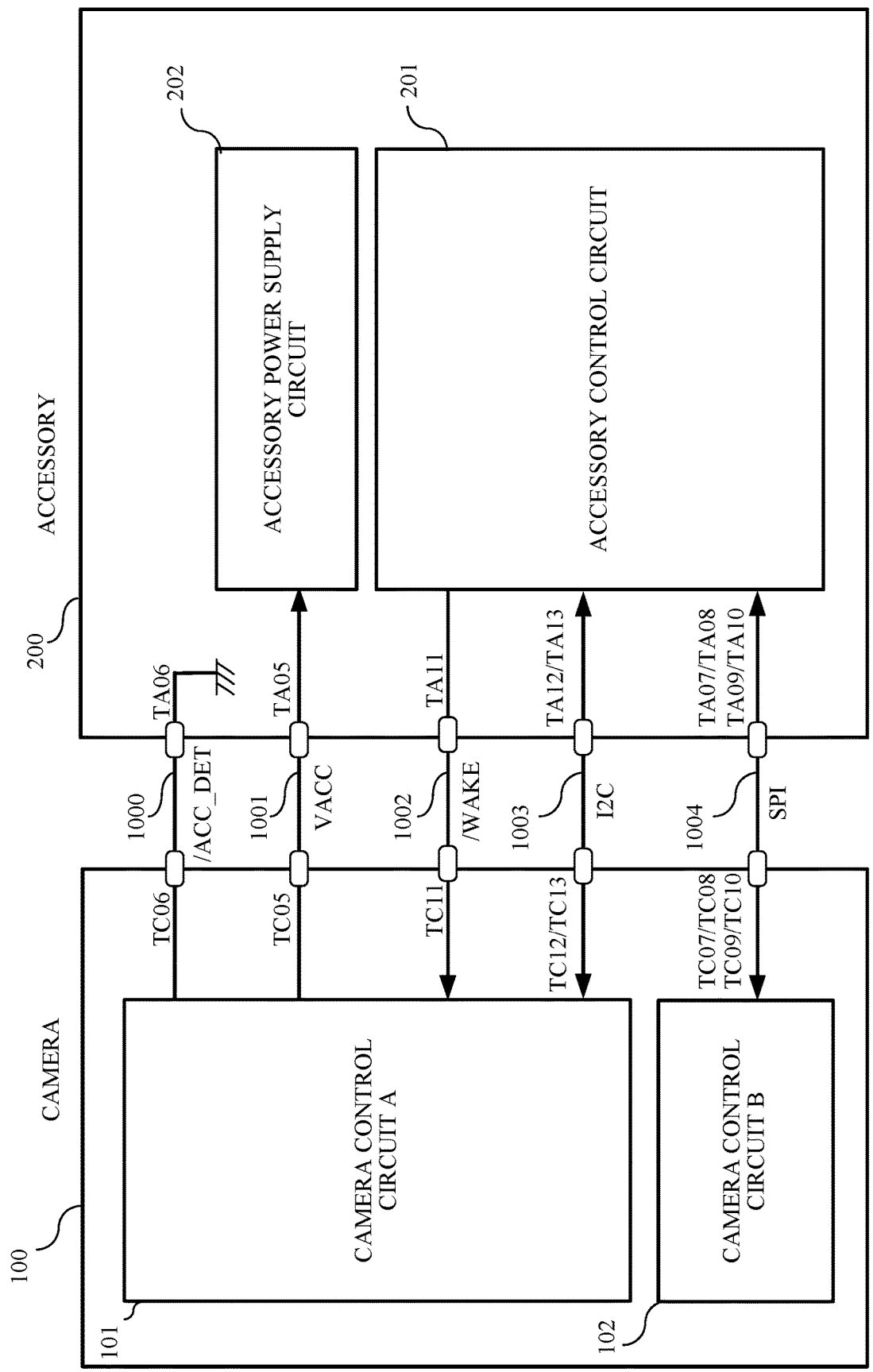
FIG. 13 illustrates a configuration of the camera and the accessory in the first embodiment.
Figure 14:
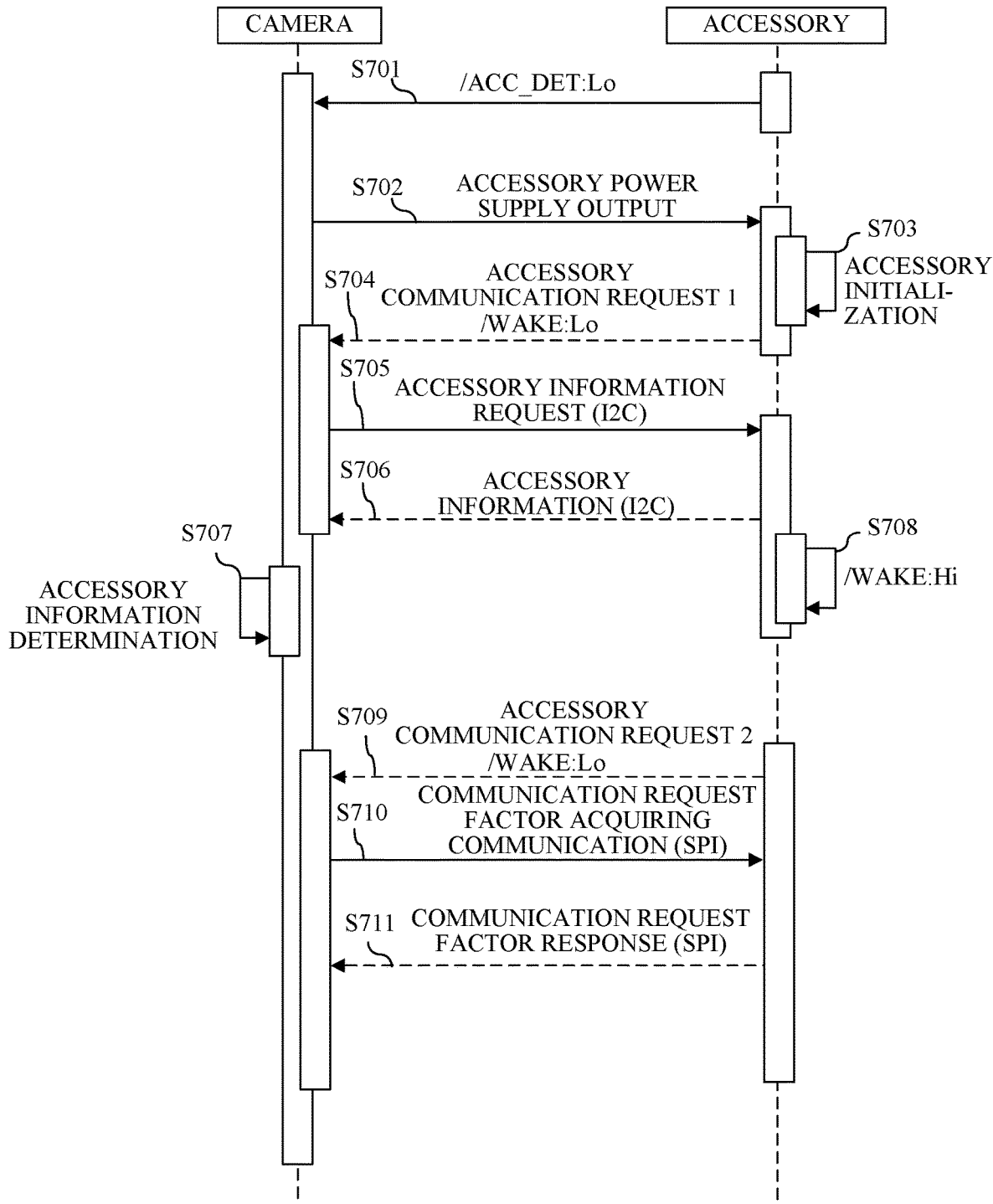
FIG. 14 is a flowchart showing processing to be performed by the camera and the accessory in the first embodiment.

Referring now to FIGS. 13 and 14, a description will be given of an example of use of a communication request signal between the camera 100 and the accessory 200 in this embodiment. FIG. 13 illustrates the camera control circuits A 101 and B 102, the accessory control circuit 201, and the accessory power supply circuit 202 illustrated in FIG. 1. FIG. 13 illustrates, among the contacts illustrated in FIG. 1, an accessory detecting line 1000 including the contacts TC06 and TA06 for the accessory attachment detecting signal/ACC_DET, a power supply line 1001 including the contacts TC05 and TA05 for the accessory power supply VACC, a communication request line 1002 including the contacts TC11 and TA11 for the communication request signal/WAKE, a first communication line 1003 including the contacts TC12, TA12, TC13, and TA13 for the I2C communication, and a second communication line 1004 including the contacts TC07 TO TC10 and TA07 to TA10 for the SPI communication.

FIG. 14 illustrates a processing sequence to be performed when the accessory 200 is attached to the camera 100. This sequence is different from that of FIG. 6 described above in a using method of the communication request signal. A description of a supply of the accessory power supply illustrated in FIG. 6 will be simplified.

When the accessory 200 is attached to the camera 100 in S701, the accessory attachment detecting signal/ACC_DET in the accessory detecting line 1000 becomes a low level. Thereby, the camera control circuit A 101 determines that the accessory 200 has been attached to the camera 100.

The camera control circuit A 101 that has determined that the accessory 200 has been attached performs control so as to output the accessory power supply VACC to the power supply line 1001 in S702.

In S703, when the accessory 200 receives the accessory power supply VACC, the accessory control circuit 201 is started. The started accessory control circuit 201 initializes each block in the accessory 200.

Thereafter, in S704, when the above initialization is completed, the preparation for communication with the camera 100 is completed, and the communication becomes available, the accessory control circuit 201 sets a communication request signal/WAKE in the communication request line 1002 to a low level for an assertion (activation) so as to notify the camera 100 of a communication permission.

The timing of notifying the camera 100 of the communication permission from the accessory 200 is not limited to the time after the accessory power supply VACC is supplied in S702. For example, as long as the accessory 200 has a built-in battery and is ready for communication when it is attached to the camera 100, the communication permission may be notified when the accessory 200 is attached.

Next, in S705, the camera control circuit A 101 that has received a notification of the communication permission from the accessory 200 requests the accessory 200 to communicate accessory information by I2C communication via the first communication line 1003.

Next, in S706, the accessory control circuit 201 that has received the communication request for the accessory information transmits the accessory information to the camera control circuit A 101 via the first communication line 1003. However, the accessory information by the I2C communication may not be communicated between the camera control circuit A 101 and the accessory control circuit 201. For example, when the accessory control circuit 201 does not have a function of storing accessory information and the accessory information is stored in a separate storage device, the accessory information may be communicated between the camera control circuit A 101 and the storage device.

Next, in S707, the camera control circuit A 101 determines, based on the received accessory information, whether or not the attached accessory 200 is controllable and a factor acquiring method in acquiring a communication request factor from the accessory 200. The camera control circuit A 101 makes a variety of settings for the camera 100. After the camera control circuit A 101 completes the settings, the camera control circuit A 101 notifies the camera control circuit B 102 of the accessory information.

On the other hand, the accessory control circuit 201 that has transmitted the accessory information (or has confirmed that the accessory information has been transmitted from the storage device) sets the communication request signal/WAKE in the communication request line 1002 to a high level for a negation (deactivation) in S708. Thereby, the camera 100 transitions to a state of waiting for a communication request from the accessory 200.

A timing for negating the communication request signal/WAKE is not limited to the time after the accessory information is transmitted in S705. For example, when the SPI communication is required between the camera 100 and the accessory 200 in order to communicate the accessory information, the communication request signal/WAKE may be negated after the SPI communication following the I2C communication.

Next, in S709, the accessory control circuit 201 sets the communication request signal/WAKE in the communication request line 1002 to a low level for an assertion in order to perform an event that requires SPI communication with the camera 100 via the second communication line 1004, and to notify the camera of the communication request.

Next, in S710, the camera control circuit B 102 requests the accessory 200 for a communication request factor from the accessory 200 in response to the notified communication request. As described above, the communication request factor is included in the accessory information, and the camera control circuit B 102 determines whether an acquiring request for the communication request factor is to be performed by the I2C communication or by the SPI communication, based on the accessory information. In this description, it is determined to be performed by the SPI communication.

In S711, the accessory control circuit 201 transmits the communication request factor to the camera 100 by the SPI communication in response to the acquiring request for the communication request factor. When the camera control circuit B 102 determines in S710 that the acquiring request for the communication request factor is to be performed by the I2C communication, the accessory control circuit 201 transmits the communication request factor to the camera 100 by the I2C communication.

In the sequence of FIG. 14 described above, the assertion of the initial communication request signal/WAKE in the communication request line 1002 (for the first time) after the accessory 200 is attached to the camera 100 and the communication is available is used for the notification of the communication permission from the accessory 200 to the camera 100. The camera 100 that has received this notification of the communication permission acquires the accessory information from the accessory 200. Thereafter, assertions of the second and subsequent communication request signals/WAKE in the communication request line 1002 after the event that requires communication with the camera 100 occurs in the accessory 200 are used for the notification of the communication request from the accessory 200 to the camera 100. The camera 100 that has received the notification of the communication request acquires the communication request factor from the accessory 200.

Thus, in this embodiment, the accessory 200 can transmit the accessory information to the camera 100 by notifying the camera 100 of the communication permission after the accessory 200 is attached to the camera 100. The communication request signal/WAKE connected to one (same) communication request line 1002 provided between the camera 100 and the accessory 200 can be used to notify the communication permission and the subsequent communication requests from the accessory 200 to the camera 100. Therefore, the accessory 200 can notify the camera 100 of the communication permission and the communication request, while the number of contacts of the camera 100 and the accessory 200 can be made smaller than that in the case where the notification of the communication permission and the notification of the communication request are performed via different contacts.

Second Embodiment

Figure 15:
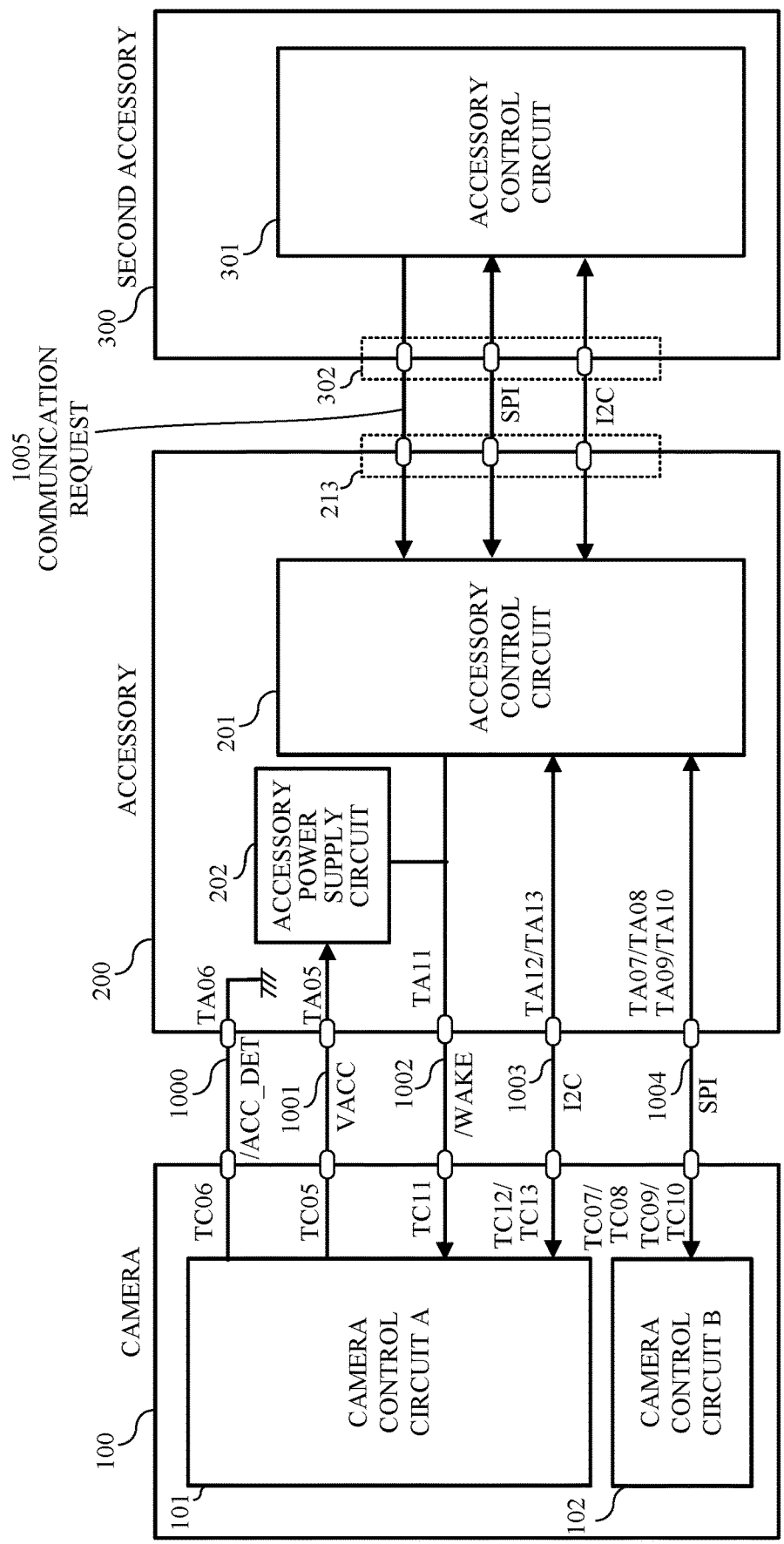
FIG. 15 illustrates a configuration of a camera, an accessory, and a second accessory in a second embodiment.
Figure 16:
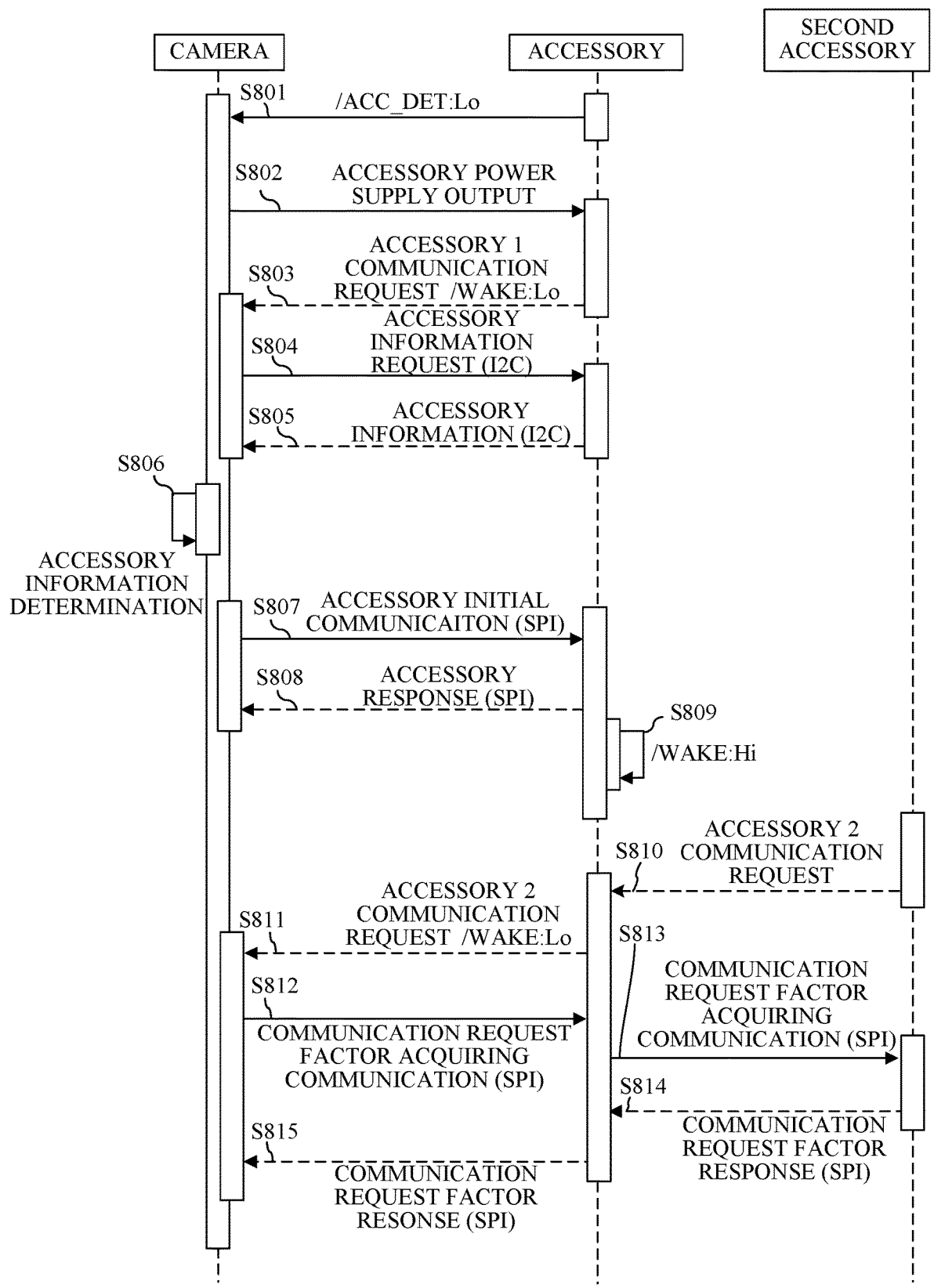
FIG. 16 is a flowchart showing processing to be performed by the camera, the accessory, and the second accessory in the second embodiment.

Referring now to FIGS. 15 and 16, a description will be given of a second embodiment according to the present invention. The second embodiment will discuss a method of using a communication request signal in the case where another accessory (referred to as a second accessory hereinafter) 300 is attached to an accessory (referred to as a first accessory hereinafter) 200 attached to the camera 100. This embodiment assumes that the first accessory 200 is an intermediate accessory and the second accessory 300 is a strobe device or the like connected to the camera 100 via the intermediate accessory.

The camera control circuits A 101 and B 102, the accessory control circuit 201, and the accessory power supply circuit 202 illustrated in FIG. 15 are the same as those in FIG. 1. In FIG. 15, the accessory detecting line 1000, the power supply line 1001, the communication request line 1002, the first communication line 1003, and the second communication line 1004 are the same as those in FIG. 13. FIG. 15 also illustrates a communication request line 1005 provided between an accessory connector 213 provided to the first accessory 200 and an accessory connector 302 provided to the second accessory 300 and third communication lines (SPI/I2C). The accessory control circuit (referred to as a first accessory control circuit hereinafter) 201 in the first accessory 200 and the accessory control circuit (referred to as a second accessory control circuit hereinafter)

301 in the second accessory 300 can perform at least one of the I2C communication and the SPI communication via the third communication line(s).

In this embodiment, the first accessory 200 performs the initial communication with the camera 100 by the I2C communication, and then transmits a communication content by the SPI communication to the second accessory 300 by the SPI communication. The first accessory 200 transmits the communication content by SPI communication from the second accessory 300 to the camera 100. The first accessory 200 also transmits a communication request signal from the second accessory 300 to the camera 100. The communication between the first accessory 200 and the second accessory 300 is controlled by the second accessory control circuit 301.

FIG. 16 illustrates a processing sequence to be performed when the first and second accessories 200 and 300 are attached to the camera 100.

In S801, when the first accessory 200 is attached to the camera 100, the accessory attachment detecting signal/ACC_DET in the accessory detecting line 1000 becomes at a low level. Thereby, the camera control circuit A 101 determines that the first accessory 200 and the second accessory 300 have been attached to the camera 100.

The camera control circuit A 101 that has determined that the first accessory 200 is attached performs control so as to output the accessory power supply VACC to the power supply line 1001 in S802. Thereby, the first accessory control circuit 201 is started. Assume that a main power supply of the second accessory 300 has already been turned on.

Next, in S803, when the preparation for communication with the camera 100 is completed and communication becomes available, the first accessory control circuit 201 sets a communication request signal/WAKE in the communication request line 1002 to a low level for an assertion so as to notify the camera 100 of a communication permission.

The timing of notifying the camera 100 of the communication permission from the first accessory 200 is not limited to the time after the accessory power supply VACC is supplied in S802. For example, if the first accessory 200 has a built-in battery and is ready for communication when it is attached to the camera 100, a communication permission may be notified when the first accessory 200 is attached.

Next, in S804, the camera control circuit A 101 that has received the notification of the communication permission from the first accessory 200 requests the first accessory 200 for communication of accessory information by I2C communication via the first communication line 1003.

Next, in S805, the first accessory control circuit 201 that has received the communication request for the accessory information transmits the accessory information to the camera control circuit A 101 via the first communication line 1003. However, the accessory information by the I2C communication may not be communicated between the camera control circuit A 101 and the accessory control circuit 201. For example, when the first accessory control circuit 201 does not have a function of storing accessory information and the accessory information is stored in a separate storage device, the accessory information may be communicated between the camera control circuit A 101 and the storage device.

Next, in S806, the camera control circuit A 101 determines whether or not the attached first accessory 200 is controllable based on the received accessory information, and a factor acquiring method for acquiring a communication request factor from the first accessory 200. The camera control circuit A 101 makes a variety of settings for the camera 100. When completing these settings, the camera control circuit A 101 notifies the camera control circuit B 102 of the accessory information.

Next, in S807, the camera control circuit B 102 performs the initial communication (predetermined communication) with the first accessory control circuit 201 by SPI communication via the second communication line 1004 for connection with the second accessory 300.

In S808, the first accessory control circuit 201 responds to the initial communication in S807 with the camera control circuit B 102 by SPI communication.

Next, in S809, the first accessory control circuit 201 sets the communication request signal/WAKE in the communication request line 1002 to a high level for a negation. Thereby, the first accessory 200 transitions to a state of waiting for a communication request from the second accessory 300.

Next, in S810, the second accessory control circuit 301 sets the communication request signal/WAKE in the communication request line 1005 to a low level for an assertion in order to perform an event that requires the SPI communication with the camera 100 through the first accessory 200, and notifies the communication request.

Next, in S811, the first accessory control circuit 201 sets the communication request signal/WAKE in the communication request line 1002 to a low level for an assertion in order to notify the camera 100 of the communication request from the second accessory 300.

Then, in S812, the camera control circuit B 102 requests the first accessory 200 for a communication request factor from the second accessory 300 in response to the notified communication request. The camera control circuit B 102 determines whether to make an acquiring request for the communication request factor by I2C communication or by SPI communication, based on the accessory information received in S805. In this description, it is determined to be performed by the SPI communication.

Next, in S813, the first accessory control circuit 201 transmits the acquiring request for the communication request factor received from the camera 100 to the second accessory 300. At this time, the first accessory control circuit 201 converts a signal level (voltage level) of the acquiring request for the communication request factor received from the camera 100 into a level suitable for communication with the second accessory 300.

Then, in S814, the second accessory control circuit 301 transmits the communication request factor to the first accessory 200 by the SPI communication in response to the acquiring request for the communication request factor.

Next, in S815, the first accessory control circuit 201 transmits the communication request factor received from the second accessory 300 to the camera 100. At this time, the first accessory control circuit 201 converts the signal level of the communication request factor received from the second accessory 300 to a level suitable for communication with the camera 100.

In this embodiment described above, the assertion of the initial communication request signal/WAKE in the communication request line 1002 (for the first time) after the first accessory 200 is attached to the camera 100 and communication is available is used for the notification of the communication permission from the accessory 200 to the camera 100. The camera 100 that has received this notification of the communication permission acquires the accessory information from the first accessory 200. Thereafter, assertions of the second and subsequent communication request signals/

WAKE in the communication request line 1002 after the event that requires communication with the camera 100 occurs in the second accessory 300 are used for the notification of the communication request from the second accessory 300 to the camera 100. The camera 100 that has received the notification of the communication request acquires the communication request factor from the second accessory 300 via the first accessory 200.

Thus, in this embodiment, the first accessory 200 can transmit accessory information to the camera 100 by notifying the camera 100 of the communication permission after the first accessory 200 is attached to the camera 100. The communication request signal/WAKE connected to one (same) communication request line 1002 provided between the camera 100 and the first accessory 200 can be used to notify the communication permission from the first accessory 200 to the camera 100 and to notify the communication request from the second accessory 300 to the camera 100. Therefore, the accessory 200 can notify the camera 100 of the communication permission and the communication request, while the number of contacts of the camera 100 and the accessory 200 can be made smaller than that in the case where the notification of the communication permission and the notification of the communication request are performed via different contacts.

Third Embodiment

Figure 17:
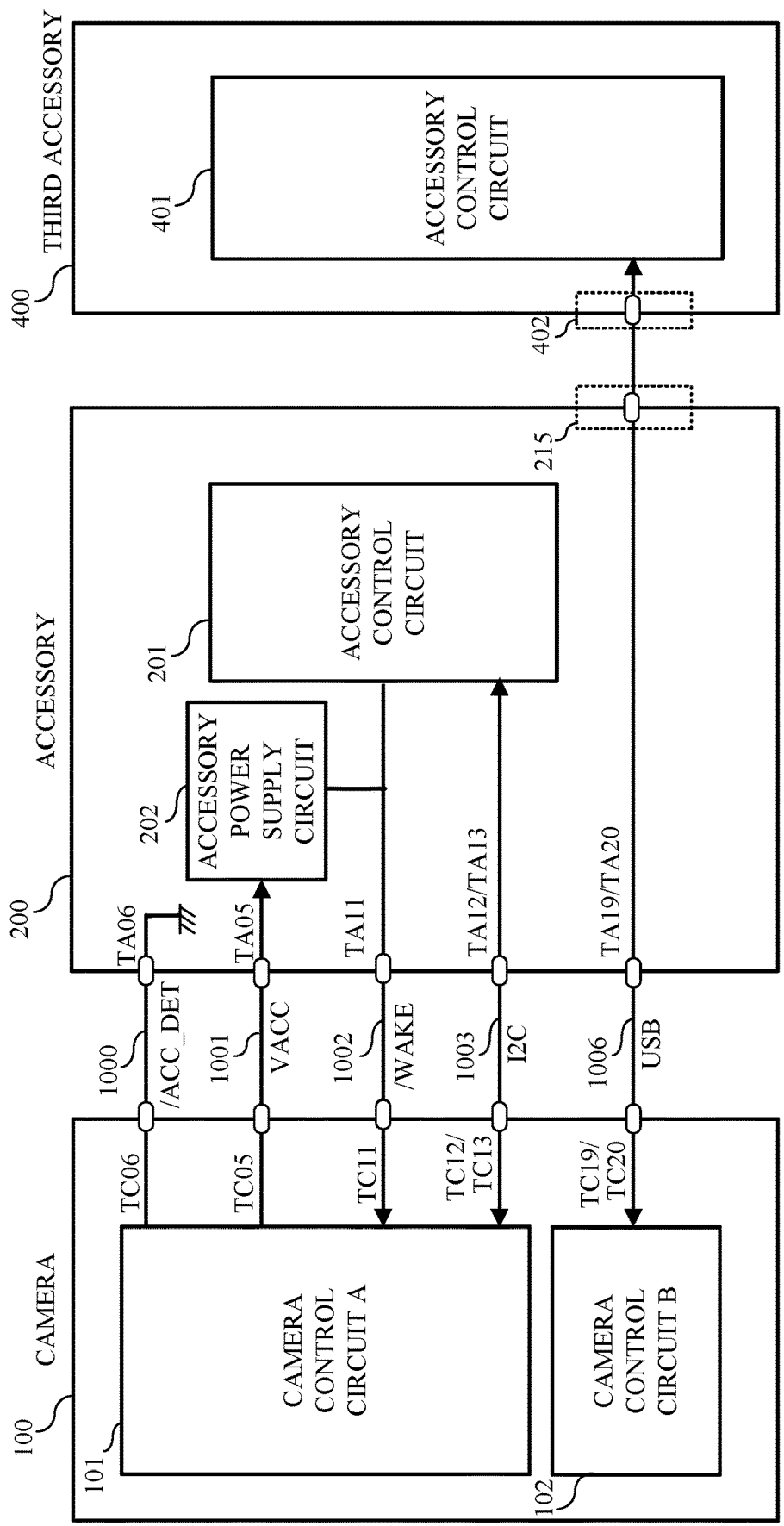
FIG. 17 illustrates a configuration of a camera, an accessory, and a third accessory in a third embodiment.
Figure 18:
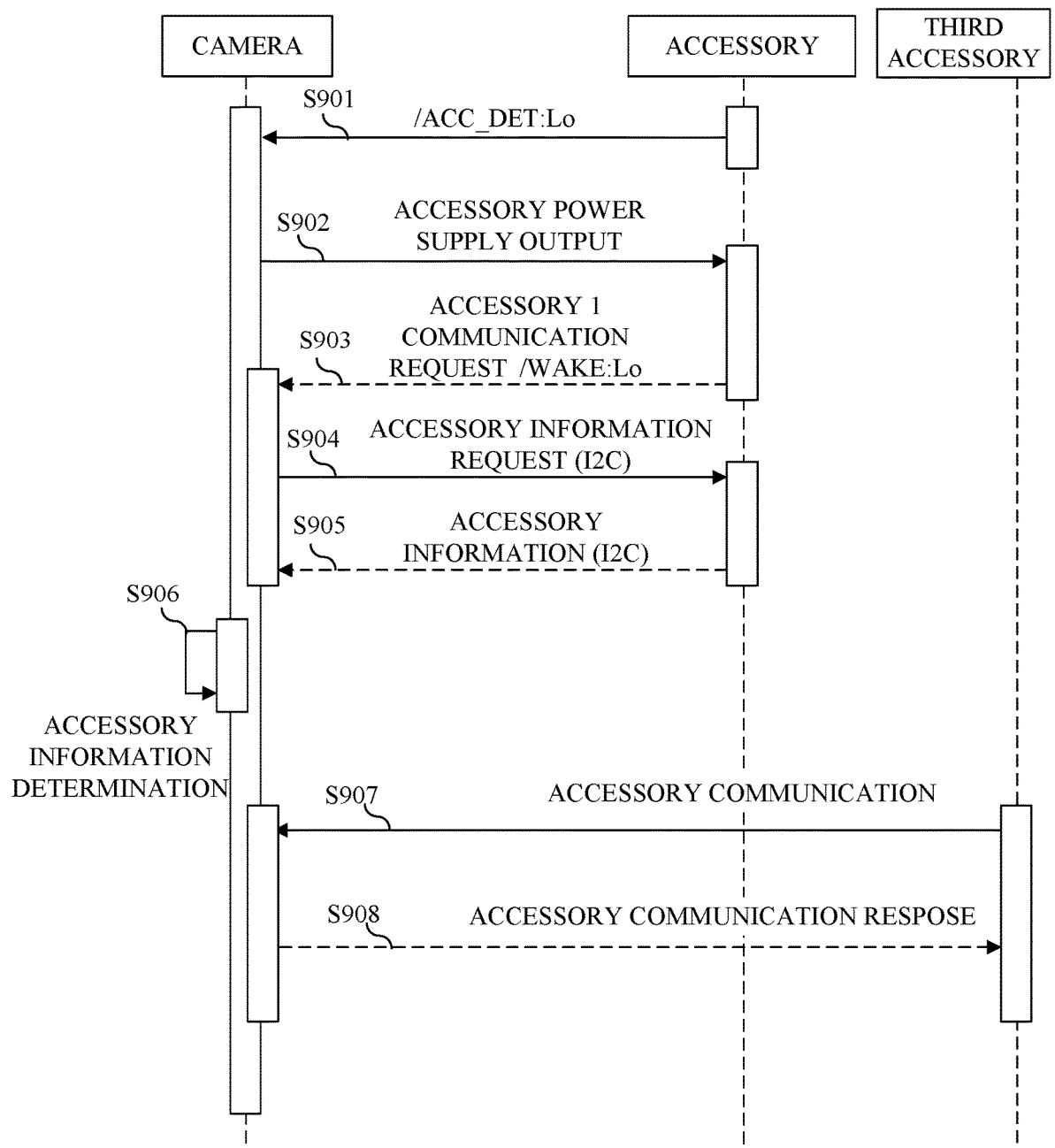
FIG. 18 is a flowchart showing processing to be performed by the camera, the accessory, and the third accessory in the third embodiment.

Referring now to FIGS. 17 and 18, a description will be given of a third embodiment according to the present invention. The third embodiment will describe a method of using a communication request signal in the case where another accessory (referred to as a third accessory hereinafter) 400 is attached to an accessory (referred to as a first accessory hereinafter) 200 attached to the camera 100. This embodiment assumes that the third accessory 400 is a smartphone or tablet terminal, and the first accessory 200 is a holder that holds the smartphone or tablet terminal. In this embodiment, the communication request signal/WAKE in the communication request line 1002 is used only to notify a communication permission.

The camera control circuits A 101 and B 102, the first accessory control circuit 201, and the accessory power supply circuit 202 illustrated in FIG. 17 are the same as those in FIG. 15. In FIG. 17, the accessory detecting line 1000, the power supply line 1001, the communication request line 1002, and the first communication line 1003 are the same as those in FIG. 15. In FIG. 17, a fourth communication line 1006 includes the contacts TC19, TA19, TC20, and TA20 illustrated in FIG. 1 and is used for USB communication. The fourth communication line 1006 is connected to an accessory control circuit (referred to as a third accessory control circuit hereinafter) 401 in the third accessory 400 via the accessory connector 215 provided in the first accessory 200 and the accessory connector 402 provided in the third accessory 400.

The third accessory control circuit 401 determines whether or not the camera 100 is communicable through the fourth communication line 1006, and if it determines that the camera 100 is communicable, the third accessory control circuit 401 communicates with the camera 100.

FIG. 18 illustrates a processing sequence to be performed when the first and third accessories 200 and 400 are attached to the camera 100.

S901 to S906 correspond to S801 to S806 of the second embodiment (FIG. 16).

In S907, the third accessory control circuit 401 serves as a host, and communicates with the camera 100 through the fourth communication line 1006.

Next, in S908, the camera control circuit B 102 responds to the communication received in S907 with the third accessory 400 through the fourth communication line 1006. In S904 to S908, the first accessory control circuit 201 maintains the assertion of the communication request signal/WAKE in the communication request line 1002.

In this embodiment described above, the assertion of the initial communication request signal/WAKE in the communication request line 1002 after the first accessory 200 is attached to the camera 100 and the communication is available is used for the notification of the communication permission from the first accessory 200 to the camera 100. The camera 100 that has received this notification of the communication permission acquires the accessory information from the first accessory 200. Thereafter, the first accessory 200 allows the communication between the camera 100 and the third accessory 400 by continuing to maintain the assertion of the communication request signal/WAKE.

Thus, in this embodiment, a communication request signal/WAKE connected to one (same) communication request line 1002 provided between the camera 100 and the accessory 200 can be used to notify the communication permission from the first accessory 200 to the camera 100 and to notify the communication permission between the third accessory 400 and the camera 100. Therefore, the accessory 200 can notify the camera 100 of the communication permission, while the number of contacts of the camera 100 and the accessory 200 can be made smaller than that in the case where the notifications of these communication permissions are performed via different contacts.

In each of the above embodiments, the accessory 200 is directly attached to the camera 100, but another attachment form may be used. For example, the camera 100 and a main accessory corresponding to the accessory 200 may communicate with each other via the main accessory and an intermediate accessory such as an adapter device to which the camera 100 is attached. In this case, the intermediate accessory may execute communication control similar to at least part of the communication control executed by the accessory 200 and the communication control executed by the camera 100, which are described in the above embodiments. The intermediate accessory may serve as an information transmission path such that the accessory outputs to the main accessory information corresponding to information input from the camera 100 and the main accessory outputs information corresponding to the input information to the camera 100. Thus, the accessory according to the embodiments of the present invention includes various accessories such as a microphone device, an illumination device, and an adapter device. Further, the adapter device can also be included in the electronic apparatus.

Each of the above embodiments can provide an accessory, an electronic apparatus, a control method, a system, and a storage medium (program), each of which enables the accessory to notify the electronic apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073178, filed on Apr. 23, 2021, which is hereby incorporated by reference herein in its entirety.

What is claimed is:

1. An accessory attachable to and detachable from an electronic apparatus, the accessory comprising:
   a plurality of communication contacts that includes a first contact;
   at least one processor; and
   at least one memory coupled to the at least one processor storing instructions that, when executed by the at least one processor, cause the at least one processor to function as a control unit configured to control communication with the electronic apparatus via the plurality of communication contacts,
   wherein in a case where the control unit changes a signal level of the first contact from a first signal level to a second signal level different from the first signal level in response to a start of a power supply, the control unit performs a predetermined communication different from a communication performed in a case where the control unit changes the signal level of the first contact from the first signal level to the second signal level in response to a factor different from the start of the power supply,
   wherein in a case where the signal level of the first contact is changed from the first signal level to the second signal level in response to a factor different from the start of the power supply, the control unit performs communication with the electronic apparatus using information indicating a communication factor,
   wherein in a case where the signal level of the first contact is changed from the second signal level to the first signal level in response to a factor different from the start of the power supply, the control unit does not perform communication with the electronic apparatus using information indicating a communication factor.

2. The accessory according to claim 1, wherein the predetermined communication includes a reception of a request for attribute information on the accessory, and a transmission of the attribute information on the accessory.

3. The accessory according to claim 2, wherein the attribute information on the accessory includes information on a communication method for receiving a request for information indicating the communication factor and for transmitting the information indicating the communication factor.

4. The accessory according to claim 3, wherein in a case where the information on the communication method indicates first information, the control unit executes, by I2C communication, the reception of the request for the information indicating the communication factor and the transmission of the information indicating the communication factor.

5. The accessory according to claim 4, wherein in synchronization with a clock signal received via a second contact in the I2C communication, the control unit receives the request for the information indicating the communication factor and transmits the information indicating the communication factor via a third contact.

6. The accessory according to claim 5, wherein the power supply is started in response to a change in a signal level of a fourth contact.

7. The accessory according to claim 6, wherein the power supply is started in response to powering-on of the electronic apparatus or an attachment of the accessory to the electronic apparatus.

8. The accessory according to claim 4, wherein in a case where the information on the communication method indicates second information, the control unit executes, by SPI communication, the reception of the request for the information indicating the communication factor and the transmission of the information indicating the communication factor.

9. The accessory according to claim 2, wherein in response to a notification of a communication request by changing the signal level of the first contact from the first signal level to the second signal level in response to the start of the power supply, the control unit executes, by I2C communication, the reception of the request for the attribute information on the accessory and the transmission of the attribute information on the accessory.

10. The accessory according to claim 1, wherein in a case where the control unit notifies the electronic apparatus of a communication request by changing the signal level of the first contact from the first signal level to the second signal level for a first time after the power supply is started, the control unit performs the predetermined communication without receiving a request for information indicating the communication factor or transmitting the information indicating the communication factor.

11. A system comprising:
    an electronic apparatus;
    the accessory according to claim 1 attachable to and detachable from the electronic apparatus.

12. An electronic apparatus attachable to and detachable from an accessory, the electronic apparatus comprising:
    a plurality of communication contacts that includes a first contact;
    at least one processor; and
    at least one memory coupled to the at least one processor storing instructions that, when executed by the at least one processor, cause the at least one processor to function as a control unit configured to control communication with the accessory via the plurality of communication contacts, wherein in a case where a signal level of the first contact is changed from a first signal level to a second signal level different from the first signal level in response to a start of a power supply, the control unit performs a predetermined communication different from a communication performed in a case where the signal level of the first contact is changed from the first signal level to the second signal level in response to a factor different from the start of the power supply;

wherein in a case where the signal level of the first contact is changed from the first signal level to the second signal level in response to a factor different from the start of the power supply, the control unit performs communication with the accessory using information indicating a communication factor, wherein in a case where the signal level of the first contact is changed from the second signal level to the first signal level in response to a factor different from the start of the power supply, the control unit does not perform communication with the accessory using information indicating a communication factor.

13. The electronic apparatus according to claim 12, wherein the predetermined communication includes a transmission of a request for attribute information on the accessory and a reception of the attribute information on the accessory.

14. The electronic apparatus according to claim 13, wherein the attribute information on the accessory includes information on a communication method for transmitting a request for information indicating the communication factor and for receiving the information indicating the communication factor.

15. The electronic apparatus according to claim 14, wherein in a case where the information on the communication method indicates first information, the control unit executes, by I2C communication, the transmission of the request for the information indicating the communication factor and the reception of the information indicating the communication factor.

16. The electronic apparatus according to claim 15, wherein in synchronization with a clock signal received via a second contact in the I2C communication, the control unit transmits the request for the information indicating the communication factor and receives the information indicating the communication factor via a third contact.

17. The electronic apparatus according to claim 16, wherein the power supply is started in response to a change in a signal level of a fourth contact.

18. The electronic apparatus according to claim 17, wherein the power supply is started in response to powering-on of the electronic apparatus or an attachment of the accessory to the electronic apparatus.

19. The electronic apparatus according to claim 15, wherein in a case where the information on the communication method indicates second information, the control unit executes, by SPI communication, the transmission of the request for the information indicating the communication factor and the reception of the information indicating the communication factor.

20. The electronic apparatus according to claim 13, wherein in response to a notification of a communication request by changing the signal level of the first contact from the first signal level to the second signal level in response to the start of the power supply, the control unit executes, by I2C communication, the transmission of the request for the attribute information on the accessory and the reception of the attribute information on the accessory.

21. The electronic apparatus according to claim 12, wherein in a case where the control unit is notified a communication request by changing the signal level of the first contact from the first signal level to the second signal level for a first time after the power supply is started, the control unit performs the predetermined communication without receiving a request for information indicating the communication factor or transmitting the information indicating the communication factor.

22. A system comprising:
the electronic apparatus according to claim 12; and
an accessory attachable to and detachable from the electronic apparatus.

23. A control method of an accessory that is attachable to and detachable from an electronic apparatus and includes a plurality of communication contacts that includes a first contact, the control method comprising the steps of:
in a case where a signal level of the first contact is changed from a first signal level to a second signal level different from the first signal level in response to a start of a power supply, performing a predetermined communication different from a communication performed in a case where the signal level of the first contact is changed from the first signal level to the second signal level in response to a factor different from the start of the power supply,
wherein in a case where the signal level of the first contact is changed from the first signal level to the second signal level in response to a factor different from the start of the power supply, performing communication with the electronic apparatus using information indicating a communication factor,
wherein in a case where the signal level of the first contact is changed from the second signal level to the first signal level in response to a factor different from the start of the power supply, not performing communication with the electronic apparatus using information indicating a communication factor.

24. A non-transitory computer-readable storage medium storing a program that causes a computer of an accessory that is attachable to and detachable from an electronic apparatus and includes a plurality of communication contacts that includes a first contact, to execute the control method according to claim 23.

25. A control method of an electronic apparatus that is attachable to and detachable from an accessory and includes a plurality of communication contacts that includes a first contact, the control method comprising the steps of:
in a case where a signal level of the first contact is changed from a first signal level to a second signal level different from the first signal level in response to a start of a power supply, performing a predetermined communication different from a communication performed in a case where the signal level of the first contact is changed from the first signal level to the second signal level in response to a factor different from the start of the power supply;
wherein in a case where the signal level of the first contact is changed from the first signal level to the second signal level in response to a factor different from the start of the power supply, performing communication with the accessory using information indicating a communication factor, wherein in a case where the signal level of the first contact is changed from the second signal level to the first signal level in response to a factor different from the start of the power supply, not performing communication with the accessory using information indicating a communication factor.

26. A non-transitory computer-readable storage medium storing a program that causes a computer of an electronic apparatus that is attachable to and detachable from an accessory and includes a plurality of communication contacts that includes a first contact, to execute the control method according to claim 25.

* * * * *